United States Patent
Hegeman et al.

(10) Patent No.: US 10,370,965 B2
(45) Date of Patent: Aug. 6, 2019

(54) METHOD FOR DETERMINING A PERMEABILITY OR MOBILITY OF A RADIAL FLOW RESPONSE OF A RESERVOIR

(75) Inventors: Peter S. Hegeman, Stafford, TX (US); Mustafa Onur, Istanbul (TR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 654 days.

(21) Appl. No.: 13/372,457

(22) Filed: Feb. 13, 2012

(65) Prior Publication Data
US 2013/0205886 A1    Aug. 15, 2013

(51) Int. Cl.
  *G01V 11/00*    (2006.01)
  *G06F 17/00*    (2019.01)
  *E21B 49/08*    (2006.01)

(52) U.S. Cl.
  CPC ............ *E21B 49/088* (2013.01); *G01V 11/00* (2013.01); *G06F 17/00* (2013.01)

(58) Field of Classification Search
  CPC ................................ G01V 11/00; E21B 49/00
  USPC .................................................. 702/6, 11, 12
  See application file for complete search history.

(56) References Cited

U.S. PATENT DOCUMENTS

| 4,860,581 | A | 8/1989 | Zimmermann et al. |
| 5,463,549 | A * | 10/1995 | Dussan V et al. ................ 702/7 |
| 6,405,136 | B1 | 6/2002 | Li et al. |
| 6,642,715 | B2 | 11/2003 | Speier et al. |
| 7,277,796 | B2 | 10/2007 | Kuchuk et al. |
| 7,448,262 | B2 | 11/2008 | Sheng et al. |
| 7,510,015 | B2 | 3/2009 | Corre et al. |
| 7,699,124 | B2 | 4/2010 | Corre et al. |
| 7,753,118 | B2 | 7/2010 | Ramakrishnan et al. |
| 2009/0114009 | A1 | 6/2009 | Thambynayagam et al. |
| 2010/0071898 | A1 | 3/2010 | Corre et al. |
| 2010/0274490 | A1 * | 10/2010 | Gok et al. ...................... 702/12 |
| 2010/0319912 | A1 | 12/2010 | Pop et al. |

OTHER PUBLICATIONS

Nicolas W. Martin and R. James Brown, Estimating anisotropic permeability from attenuation anisotropy using 3C-2D data, 1995, CREWES Research Report, vol. 7, pp. 1-7.*
Shao-Chih Way and ChesterR. McKee, In-Situ Determination of Three-Dimensional Aquifer Permeabilities, Mar. 1983, In-Situ, Inc., pp. 594-603.*

(Continued)

*Primary Examiner* — Mohamed Charioui
(74) *Attorney, Agent, or Firm* — Sara K.M. Hinkley

(57) ABSTRACT

A system and method determine formation permeability and/or at least one property indicative of formation permeability of a subsurface geological reservoir having radial-flow. Pressure data is obtained with an observation probe during a formation test, wherein the observation probe is located at a setting position within an open hole wellbore formed within the reservoir. The system and method measure radial-flow response of the reservoir at or adjacent to the setting position of the observation probe by analyzing the collected pressure data. The formation permeability and/or at least one property indicative of the permeability of the reservoir is determined based on the measured radial-flow response of the reservoir at or adjacent to the observation probe.

13 Claims, 12 Drawing Sheets

(56) References Cited

OTHER PUBLICATIONS

International Search Report and the Written Opinion for International Application No. PCT/US2013/023966 dated May 27, 2013.
Abbaszadeh, et al., "Pressure-Transient Analysis for a Slanted Well in a Reservoir with Vertical Pressure Support", SPE 19045—SPE Formation Evaluation, vol. 5 (3), Sep. 1990, pp. 277-284.
Amos, D.E., "Algorithm 610: A Portable FORTRAN Subroutine for Derivatives of the Psi Function", ACM Transactions on Mathematical Software, vol. 9 (4), Dec. 1983, pp. 494-502.
Besson, J., "Performance of Slanted and Horizontal Wells on an Anisotropic Medium", SPE 20965—European Petroleum Conference, The Hague, Netherlands, Oct. 21-24, 1990, pp. 1-14.
Carter, et al., "Performance Matching With Constraints", SPE 4260—Society of Petroleum Engineers Journal, vol. 14 (2), 1974, pp. 187-196.
Earlougher Jr., R.C., "Analysis and Design Methods for Vertical Well Testing", SPE 8038—Journal of Petroleum Technology, vol. 32 (3), 1980, pp. 505-514.
Goode, et al., "Permeability Determination With a Multiprobe Formation Tester", SPE 20737—SPE Formation Evaluation, vol. 7 (4), 1992, pp. 297-303.
Kuchuk, F.J. "Pressure Behavior of Horizontal Wells in Multilayer Reservoirs with Crossflow", SPE 22731—SPE Formation Evaluation, vol. 11 (1), 1996, pp. 55-64.
Kuchuk, et al., "Interpretation of Wireline Formation Tester Packer and Probe Pressures", SPE 28404—SPE Annual Technical Conference and Exhibition, New Orleans, Louisiana, Sep. 25-28, 1994, pp. 1-12.
Kuchuk, "Pressure Behavior of the MDT Packer Module and DST in Crossflow-Multilayer Reservoirs", SPE 39523—SPE Journal of Petroleum Science and Engineering, vol. 11 (2), Jun. 1994, pp. 123-135.
Kuchuk, F.J. "Interval Pressure Transient Testing With MDT Packer-Probe Module in Horizontal Wells", SPE 53002—SPE Reservoir Evaluation and Engineering, vol. 1 (6), 1998, pp. 509-518.
Kuchuk, F.J., "Muitiprobe wireline formation tester pressure behavior in crossflow-layered reservoirs", In Situ, vol. 20 (1), 1996, pp. 1-40.
McKinley, et al., "A Field Application of Pulse-Testing for Detailed Reservoir Description", SPE 1822—Journal of Petroleum Technology, vol. 2 (3), 1968, pp. 313-321.
Prats, et al., "A Method for Determining the Net Vertical Permeability Near a Well From In-Situ Measurements", SPE 2511—Journal of Petroleum Technology, vol. 22 (5), 1970, pp. 637-643.
Zimmerman, T. et al., "Application of Emerging Wireline Formation Technologies", OSEA 90105—Offshore South East Asia Conference, Singapore, Dec. 4-7, 1990, 13 pages.
Office Action issued in the related CN Application 201380016656.6, dated Sep. 27, 2016 (14 pages).
Examination report issued in the related AU application 2013219864, dated Sep. 12, 2014 (2 pages).
International Preliminary Report on Patentability issued in the related PCT Application PCT/US2013/023966, dated Aug. 19, 2014.
Earlougher, Jr., "Advances in Well Test Analysis", SPE Monograph Series, vol. 5, 1977, 22 pgs.
Press, et al., "Numerical Recipes: The Art of Scientific Computing", Cambridge University Press, 3rd Edition, Sep. 10, 2007, 53 pgs.
Cody, et al. "Chebyshev Approximations for the Psi Function", Mathematics of Computation, vol. 27 (121), Jan. 1973, pp. 123-127.
Second Office Action issued in the related CN Application 201380016656.6, dated May 16, 2017 (10 pages).
Third Office Action issued in the related CN Application 201380016656.6, dated Oct. 20, 2017 (11 pages).

* cited by examiner

| Inclination angle $\theta_-$, deg | b, psi Eq. 35 | b, psi MdtPackerProbe | % error in b from Eq. 35 | Z, requirement, ft Eq. 36 |
|---|---|---|---|---|
| 0 (VERTICAL) | 1.475 | 1.494 | 1.31 | 1.98 |
| 15 | 1.498 | 1.518 | 1.29 | 2.07 |
| 30 | 1.578 | 1.598 | 1.27 | 2.40 |
| 45 | 1.743 | 1.766 | 1.30 | 3.13 |
| 65 | 2.228 | 2.261 | 1.48 | 5.73 |
| 80 | 2.905 | 2.954 | 1.66 | 10.54 |
| 90 (HORIZONTAL) | 3.191 | 3.251 | 1.84 | 13.01 |

| Inclination angle $\theta_-$, deg | $k_V$, md | % error in $k_V$ |
|---|---|---|
| 0 (VERTICAL) | 10.84 | 8.4 |
| 15 | 11.93 | 19.3 |
| 30 | 16.5 | 65 |
| 45 | 32.6 | 226 |
| 65 | 242 | 2,320 |
| 80 | 3,980 | 39,700 |
| 90 (HORIZONTAL) | 13,270 | 132,600 | ps
METHOD FOR DETERMINING A PERMEABILITY OR MOBILITY OF A RADIAL FLOW RESPONSE OF A RESERVOIR

BACKGROUND OF THE DISCLOSURE

A wellbore is generally drilled into the ground to recover natural deposits of hydrocarbons trapped in a geological formation below the Earth's crust. The wellbore is traditionally drilled to penetrate a subsurface hydrocarbon reservoir in the geological formation. As a result, the trapped hydrocarbons may be released and recovered from the wellbore.

Permeability, mobility and permeability anisotropy associated with the reservoir often are parameters related to reservoir management. Permeability, mobility and permeability anisotropy of the reservoir directly affect well productivity and reservoir displacement processes. As a result, determination of permeability, mobility and/or permeability anisotropy of the reservoir is becoming increasingly more important as emphasis shifts from primary recovery mechanisms to secondary and tertiary recovery mechanisms. The reservoir may have permeability distributions defined by at least two components, such as, for example, horizontal permeability and vertical permeability in the region of the reservoir located adjacent to the wellbore.

BRIEF DESCRIPTION OF THE DRAWINGS

So that the features and advantages of the present disclosure can be understood in detail, a more particular description of the disclosure may be had by reference to the embodiments thereof that are illustrated in the appended drawings. It is to be noted, however, that the appended drawings illustrate one or more of numerous embodiments of this disclosure and are therefore not to be considered limiting of its scope, for the present disclosure may admit to other equally effective embodiments.

DETAILED DESCRIPTION OF EMBODIMENTS

The disclosure relates to determining permeability or a property indicative of permeability of a subsurface geological reservoir. The disclosure includes a method for determining the permeability or a property indicative of the permeability of the reservoir based on one or more pressure measurements. As an example, the disclosure sets forth a method of determining vertical and/or horizontal permeability from analysis of transient pressure data acquired during an interval pressure transient test.

Figure 1A:
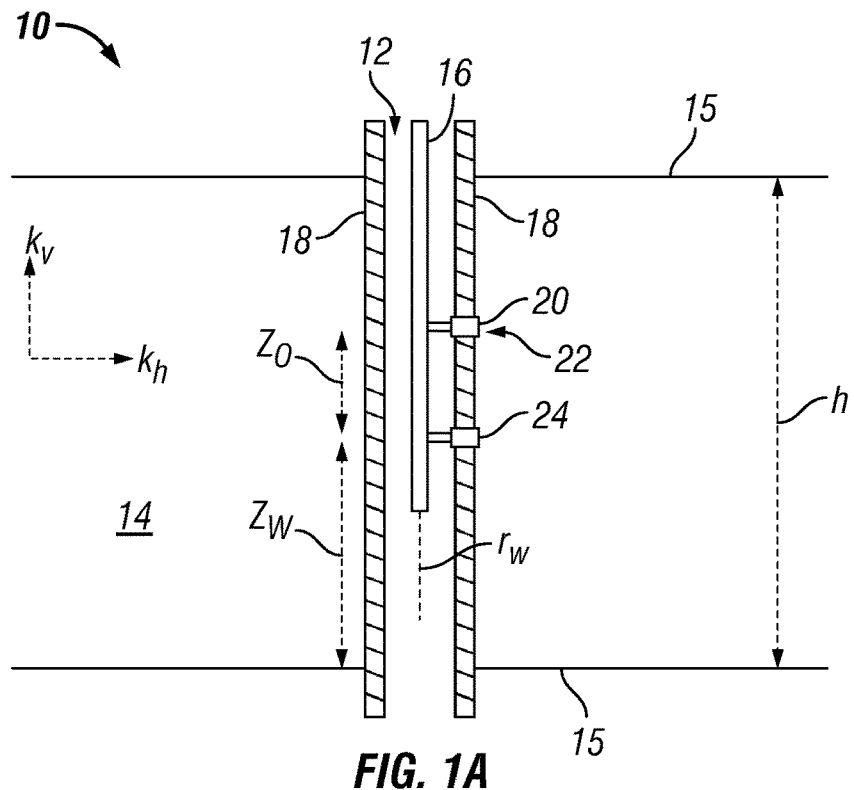
FIG. 1a illustrates a schematic diagram, including a cross-sectional view, of a formation testing tool in a vertical wellbore according to an embodiment.
Figure 1B:
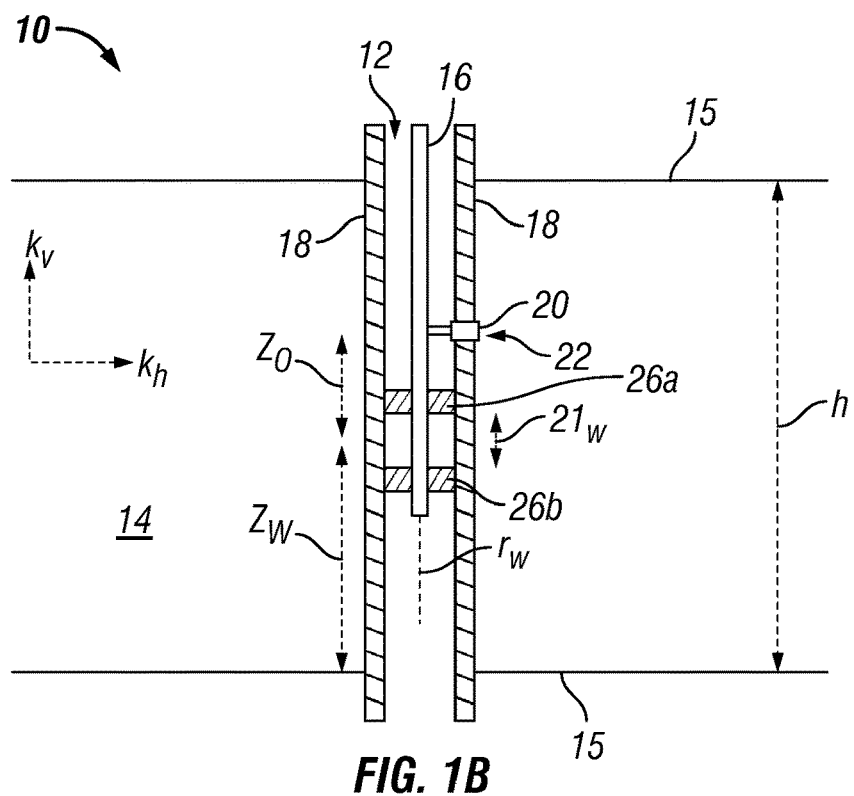
FIG. 1b illustrates a schematic diagram, including a cross-sectional view, of a formation testing tool in a vertical wellbore according to an embodiment.
Figure 1C:
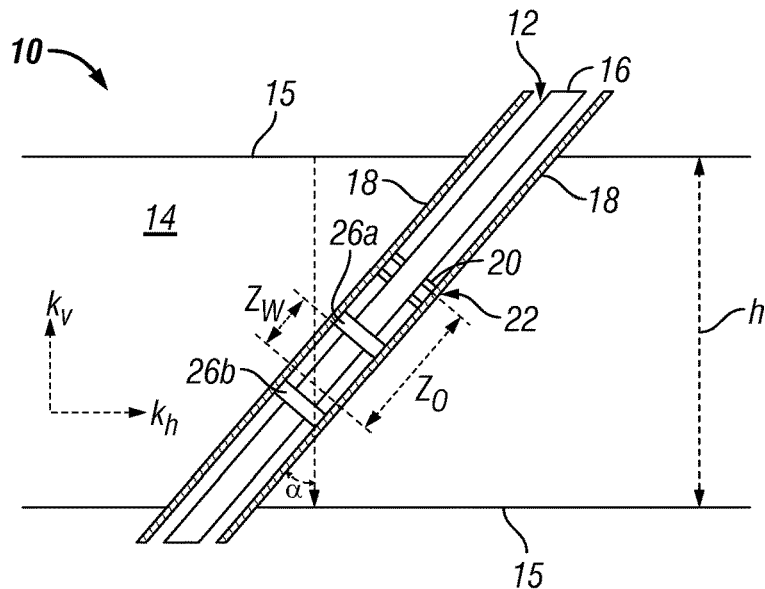
FIG. 1c illustrates a schematic diagram, including a cross-sectional view, of a formation testing tool in an inclined wellbore according to an embodiment.

Referring now to the drawings wherein like numerals refer to like parts, FIGS. 1a-1c schematically illustrate a wellbore system 10, which may be an onshore wellbore or an offshore wellbore system, for measuring characteristics and/or properties of a subsurface geological reservoir 14 (hereinafter "reservoir 14"). The wellbore system 10 has a wellbore 12 formed within the reservoir 14 below the Earth's surface. The wellbore 12 may be, for example, a vertical wellbore as shown in FIGS. 1a and 1b, an inclined wellbore as shown in FIG. 1c, a horizontal wellbore or have any combination of vertical, horizontal and inclined portions. The wellbore 12 is formable in the reservoir 14 by a drilling process as known to one of ordinary skill in the art and may be, for example, an open hole without casing or the like. The reservoir 14 may be, for example, a vertically-unbounded formation, having no apparent formation layers; alternatively, the reservoir 14 may have finite formation thickness between formation boundaries 15 (as shown in FIGS. 1a-1c) as will be appreciated by those having ordinary skill in the art.

A downhole tool 16 (hereinafter "tool 16") is lowered and/or run into the wellbore 12. The downhole tool 16 may be conveyed into the wellbore 12 by any known conveyance, such as drill pipe, coiled tubing, wireline, slickline, cable or any other type of conveyance. As a result, the tool 16 is positionable within the wellbore 12 and locatable adjacent to one or more walls 18 (hereinafter "walls 18") of the wellbore 12. In embodiments, the tool 16 is configurable to collect one or more pressure measurements and/or data (hereinafter "pressure data") relating to the wellbore 12, the walls 18 of the wellbore 12 and/or the reservoir 14 (hereinafter "the well/reservoir system 12, 14, 18"). The tool 16 may have a pressure sensor located within a flowline of the tool 16 configured to collect pressure data relating to the well/reservoir system 12, 14, 18. For example, the tool 16 may be a formation testing tool configured to collect the pressure data. The tool 16 may be connected to and/or incorporated into, for example, a drill string, a test string or a tool string as known to one of ordinary skill in the art. In embodiments, the tool 16 may be connected to and/or incorporated into, for example, a modular formation dynamic tester (hereinafter "MDT") test string. The drill string, test string or tool string may include one or more additional downhole components (hereinafter "downhole components"), such as, for example, drill pipe, one or more drill collars, a mud motor, a drill bit, a telemetry module, an additional downhole tool and/or one or more downhole sensors. It should be understood that the drill string, test string or tool string may include any number of and/or any type of downhole components as known to one of ordinary skill in the art.

In embodiments, the tool 16 is a wireline configurable tool which is a tool commonly conveyed in the wellbore 12 by wireline cable, such as, for example, a wireline cable 64 (shown in FIG. 3) as known to one having ordinary skill in the art. For example, the wireline configurable tool may be an MDT tool for formation testing, or a logging tool or testing tool for sampling or measuring properties and/or characteristics associated with the well/reservoir system 12, 14, 18. It should be understood that the tool 16 may be any wireline configurable tool as known to one or ordinary skill in the art.

Figure 2:
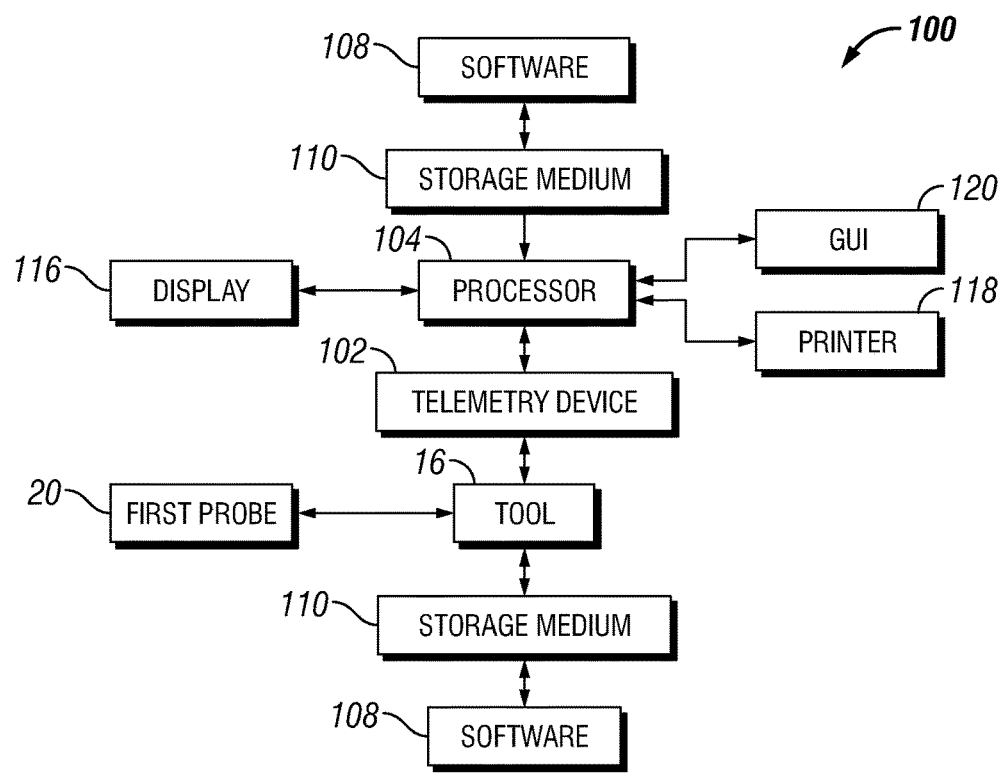
FIG. 2 illustrates a schematic diagram of a system in accordance with an embodiment.

In embodiments, the tool 16 has a wellbore telemetry device 102 (hereinafter "telemetry device 102") as shown by the system 100 illustrated in FIG. 2. For example, U.S. Pat. No. 6,405,136, which is incorporated by reference herein in its entirety, describes data compression techniques for communication between wellbore telemetry devices and surface recording systems. The tool 16 may be any device or component configured to and/or adapted to measure one or more properties associated with the well/reservoir system 12, 14, 18. The tool 16 may have capabilities for measuring, collecting, obtaining, processing, and storing data, as well as, for communicating with equipment located at the Earth's surface. For example, a telemetry device 102, as shown in FIG. 2, may communicate with the surface equipment, such as, for example, a surface system processor 104 (hereinafter "processor 104") located at the Earth's surface via wellbore telemetry. The wellbore telemetry may include, for example, wireline telemetry, mud pulse telemetry, acoustic telemetry, electromagnetic telemetry, wire-drill pipe telemetry and/or real-time bidirectional drill string telemetry. The processor 104 may be located locally or remotely with respect to the wellbore system 10. The processor 104 may be located in a remote location with respect to the wellbore system 10, such as, for example, a testing lab, a research and development facility and/or the like. It should be understood that the type of wellbore telemetry utilized by the telemetry device 102 may be any type of telemetry capable of communicating and/or sending data and/or information from the tool 16 to the processor 104 as known to one of ordinary skill in the art.

In embodiments, the tool 16 has at least one first probe 20 as shown in FIGS. 1a-1c and 2. The first probe 20 may detect, obtain and/or collect the data associated with the well/reservoir system 12, 14, 18. For example, the first probe 20 may have a pressure sensor configured to obtain pressure data associated with the well/reservoir system 12, 14, 18. The pressure data may relate to permeability of the reservoir 14 and/or one or more properties indicative of permeability of the reservoir 14, such as, for example, formation mobility of the reservoir 14. For example, the tool 16 and/or the first probe 20 may detect, obtain or measure a pressure of the fluid in the reservoir 14. The tool 16 and/or the first probe 20 may provide fluid communication between the tool 16 and the wellbore 12 and/or the reservoir 14, such as being capable of injecting fluid into or withdrawing fluid from the reservoir 14.

Pressure data associated with the well/reservoir system 12, 14, 18 is measured, collected, obtained and/or detected (hereinafter "measured") by the tool 16 and/or the first probe 20 of the tool 16. The tool 16 and/or the processor 104 processes, analyzes, and/or manipulates the measured pressure data to determine the permeability and/or the one or more properties indicative of permeability of the reservoir 14. The processed, analyzed, and/or manipulated pressure data may be accessible and/or viewable by an operator at the Earth's surface via a display 116, connectable to and/or in data communication with the processor 104.

As an example, the tool 16 may be deployed in the wellbore 12 during a formation test, such as, for example, an interval pressure transient test (hereinafter "IPTT test") as shown in FIGS. 1a-1c. During the IPTT test, the tool 16 and/or the first probe 20 is configured and/or adapted to measure pressure data representing one or more pressure measurements at one or more locations within the wellbore 12. The operator, at the Earth's surface, may input and/or enter information, one or more parameters and/or data (hereinafter "input data") into a graphic user interface 120 (hereinafter "GUI 120") connected to and/or in data communication with the processor 104. One or more characteristics and/or properties associated with the well/reservoir system 12, 14, 18 may be evaluated, computed, determined and/or calculated based at least in part on the measured pressure data and/or in part on the input data. The input data may include, for example, formation model information and associated properties, well model information and associated properties, well and reservoir properties, tool configuration data, control parameters and/or the like. It should be understood that the input data may be any information, parameters and/or data as known to one of ordinary skill in the art.

Other examples of the tool 16 include a single-probe formation testing tool (hereinafter "single-probe tool") as shown in FIG. 1a, a dual-probe formation testing tool or multi-probe formation testing tool (not shown in the drawings), a single-packer formation testing tool (not shown in the drawings), a dual-packer formation testing tool (hereinafter "dual-packer tool") as shown in FIGS. 1b and 1c and/or any combination thereof. Examples of the single-packer formation testing tool are shown in U.S. Pat. Nos. 7,510,015 and 7,699,124, and U.S. Patent Publication Nos. 20100319912 and 20100071898, which are each hereby incorporated by reference in its entirety. The dual-packer tool has two inflatable packer elements 26a, 26b (hereinafter "packer elements 26a, 26b") as shown in FIGS. 1b and 1c. The dual-packer tool may utilize the single packer herein referenced. When inflated, the packer elements 26a, 26b seal against the walls 18 of the wellbore 12 to isolate at least one interval having length $2l_w$. The dual-packer tool may improve pressure measurements and fluid sampling in, for example, low-permeability, laminated or fractured formations. Moreover, the tool 16 is configured to conduct, execute and/or complete one or more downhole tests, such as, for example, a local production test, a buildup test, a drawdown test, an interference test and/or the like. The interference test includes the IPTT test and/or a vertical interference test.

In an embodiment, the first probe 20 of the tool 16 measures pressure data associated with, for example, one or more transient flow regimes of the reservoir 14. The first probe 20 may extend toward and/or into the walls 18 of the wellbore 12 and provide fluid communication with the reservoir 14. As a result, the first probe 20 may contact or abut the walls 18 of the wellbore 12. It should be understood that the tool 16 may include any number of probes as known to one of ordinary skill in the art.

The tool 16 may have a second probe 24 positioned away from first probe 20 when the tool 16 is positioned in the wellbore 12. The second probe 24 may be located on a same side of the tool 16 as the first probe 20. In an embodiment, the first probe 20 may be utilized as an observation probe, and the second probe 24 may be utilized as a source or sink probe as will be appreciated by those having ordinary skill in the art. The second probe 24 is configured to extend and/or move outwardly with respect to the tool 16 as shown in FIG. 1a. The second probe 24 is configured and/or adapted to penetrate and/or extend into the walls 18 of the wellbore 12 and/or into the reservoir 14. When in the form of a dual-packer formation testing tool, the tool 16 has the packer elements 26a, 26b positioned away from, uphole or downhole with respect to the first probe 20 when the tool 16 is located in the wellbore 12 as shown in FIGS. 1b and 1c. The dual-packer formation testing tool may define an interval or a portion of the wellbore 12 to be utilized as a source as will be appreciated by those having ordinary skill in the art. The source is configured to inject fluids into the reservoir 14 and/or to withdraw fluids from the reservoir 14 as known to one of ordinary skill in the art.

The first probe 20 may be located at and/or positioned at a longitudinally displaced setting position 22 (hereinafter "setting position 22") within the wellbore 12 as shown in FIGS. 1a-1c. When the first probe 20 is positioned at the setting position 22, the first probe 20 and/or the second probe 24 (hereinafter "probes 20, 24") may be expanded outwardly from the tool 16 such that the probes 20, 24 may be located adjacent to, in contact with, abutting, penetrating and/or extending into the well/reservoir system 12, 14, 18 as shown in FIG. 1a. The tool 16 and/or the first probe 20 measures the pressure data that may include, for example, transient pressure data at or adjacent to the setting position 22 of the first probe 20, such as during the IPTT test. The pressure data is associated with pressures observable at the walls 18 of the wellbore 12 and/or within the reservoir 14 at or adjacent to the setting position 22 of the first probe 20. In embodiments, the source, such as, for example the second probe 24 or the dual-packer formation testing tool may be utilized to create a pressure change, such as by being utilized for a drawdown or a buildup, which may be part of a drawdown test or a buildup test, respectively. During a drawdown, the tool 16 may withdraw fluid from the reservoir 14. The drawdown may permit measurement, analysis, collection and/or determination of pressure measurements and/or data collected by the tool 16 and/or the first probe 20. During a buildup, the tool 16 may permit the reservoir 14 to increase in pressure by, for example, stopping the withdrawal of fluid from the reservoir 14, and/or other methods known to those having ordinary skill in the art. The buildup may permit measurement, analysis, collection and/or determination of pressure data collected by the tool 16 and/or the first probe 20.

During the IPTT test, the tool 16 and/or the first probe 20 may collect, obtain and/or detect pressure measurements of the reservoir 14 to evaluate or determine one or more properties associated with the reservoir 14, such as, for example, spatial formation permeability, radial flow response, formation mobility, and/or pressure distribution of the reservoir 14 at a region located locally or adjacent with respect to the setting position 22 of the first probe 20. The properties associated with the reservoir 14 may be any property or properties indicative of permeability of the reservoir 14 as known to one having ordinary skill in the art. For example, the spatial formation permeability evaluated and/or tested by the tool 16 includes formation permeability of the reservoir 14 in the horizontal direction (hereinafter "horizontal permeability") and/or in the vertical direction (hereinafter "vertical permeability"). Moreover, formation mobility evaluated and/or tested by the tool 16 includes formation mobility in the horizontal direction (hereinafter "horizontal mobility") and/or in the vertical direction (hereinafter "vertical mobility").

The terms "horizontal permeability" and "vertical permeability" are commonly used in the oilfield industry to refer to permeability parameters parallel or substantially parallel to formation bed boundaries of the reservoir 14 and perpendicular or substantially perpendicular to the formation bed boundaries, respectively. However, if the formation bed boundaries are not actually horizontal, then "horizontal permeability" and "vertical permeability" may not actually be horizontal and vertical, respectively. Nevertheless, it is understood that the terms horizontal permeability and vertical permeability may be used to refer to permeability parallel or substantially parallel to the bed boundaries and perpendicular or substantially perpendicular to the bed boundaries, respectively, hereinafter. A "vertical well" may be considered to be a wellbore drilled perpendicular or substantially perpendicular to the formation bed boundaries, and a "horizontal well" may be considered to be a wellbore drilled parallel or substantially parallel to the formation bed boundaries. Thus, if the formation bed boundaries are not actually horizontal, then a "vertical well" and a "horizontal well" may not actually be vertical or substantially vertical and horizontal or substantially horizontal, respectively.

The term "anisotropy" refers to a variation of a property with the direction in which it is measured. Rock permeability is a measure of its conductivity to fluid flow through its pore spaces. Reservoir rocks often exhibit permeability anisotropy whereby conductivity to fluid depends on a direction of flow of the fluid. This is most often true when comparing permeability measured parallel or substantially parallel to the formation bed boundaries, which may be referred to as horizontal permeability, $k_h$, and permeability measured perpendicular or substantially perpendicular to the formation bed boundaries which may be referred to as vertical permeability, $k_v$. Such permeability anisotropy is referred to as 2-dimensional (hereinafter "2D") anisotropy. In some cases, there may even be anisotropy within the plane parallel or substantially parallel to the formation bed boundaries, such that instead of a single value of horizontal permeability, $k_h$, there may be separate components measured in orthogonal or substantially orthogonal directions, such as, for example x and y direction, referred to as $k_x$ and $k_y$, respectively. Rock that exhibits variation in permeability when measured vertically or substantially vertically, as well as, both horizontal or substantially horizontal directions is said to have 3-dimensional (hereinafter "3D") anisotropy. Rock that exhibits no directional variation in permeability is referred to as "isotropic".

The pressure measurements or data may be obtained by the tool 16 and/or the first probe 20 of the tool 16. The tool 16 or the processor 104 may then analyze the obtained pressure data to calculate, compute and/or determine the permeability and/or the one or more properties indicative of permeability of the reservoir 14. The calculation, computation and/or determination of permeability is based at least in part on at the pressure measurements or data. Other information or data may also be used, such as data input by the operator.

For a vertically-unbounded formation, the pressure measurements or data obtained by the tool 16 and/or the first probe 20 may relate to a transient pressure response of the reservoir 14 adjacent to the tool 16 or the setting position 22 of the first probe 20. As a result, the tool 16 and/or the processor 104 may determine fluid flow for the reservoir 14, such as, for example, spherical flow at or adjacent to the tool 16 or the first probe 20.

For a formation having a finite formation thickness, h (as shown in FIGS. 1a-1c), the tool 16 and/or the first probe 20 obtains pressure measurements or data associated with a resulting radial-flow response at or adjacent to the tool 16 and/or the setting position 22 of the first probe 20. The tool 16 and/or the processor 104 is configured and/or adapted to analyze, compute, calculate and/or determine the permeability and/or one or more properties indicative of permeability of the reservoir 14, such as, for example, formation horizontal permeability and/or vertical permeability. The permeability and/or one or more properties indicative of permeability may be based on the pressure measurements of the radial-flow response at a region adjacent to the tool 16 and/or the setting position 22 of the first probe 20. The tool 16 and/or the processor 104 is connected to and/or in data communication with a storage medium 110 for storing, accessing and executing software 108 and/or one or more computer programs as shown in FIG. 2. After accessing the software 108 and/or the one or more computer programs stored in the storage medium 110, the tool 16 and/or the processor 104 may execute the software 108 and/or the one or more computer programs to perform one or more calculations, computations and/or analysis of the pressure measurement or data. As a result, the software 108 accessible and executable by the tool 16 and/or the processor 104 calculates, computes, analyzes and/or determines the permeability and/or the one or more properties indicative of permeability of the reservoir 14, such as, for example the formation horizontal mobility, the formation vertical mobility, the formation horizontal permeability and/or the formation vertical permeability. The storage medium 110 may be any storage medium capable of storing the software 108 and/or the one or more computer programs.

For an unbounded formation in the vertical direction, the transient pressure response (i.e., spherical flow response) has been studied. For example, methods to determine horizontal and vertical permeability from observation probe spherical-flow response when flowing through a single-probe tool may be found in, for example, "Application of Emerging Wireline Formation Technologies," Zimmerman et al., paper OSEA 90105 presented at the 1990 Offshore South East Asia Conference, Singapore, December 4-7, and/or "Permeability Determination With a Multiprobe Formation Tester," Goode et al., SPEFE, December 1992, 297-303, SPE 20737-PA. These methods require two observation probes, a first observation probe positioned on an opposite side of the wellbore on a same vertical plane as a sink probe, and the second observation probe displaced vertically on a same azimuthal plane with respect to the sink probe. These methods do not disclose determination methods for a flow through a dual-packer tool. A method to determine horizontal and vertical permeability from observation probe spherical-flow response when flowing through a dual-packer tool may be found in, for example, U.S. Patent Application Publication No. 20100274490.

A technique for interpreting an IPTT test has been described in, for example, U.S. Pat. No. 7,277,796. The technique proposed that permeability across the tested zone may be estimated using conventional pressure transient analysis and stated that in the case where both spherical-flow and radial-flow regimes are observed, both horizontal and vertical permeability are obtainable. However, the determination of both horizontal and vertical permeability based on radial-flow alone has not been disclosed. In addition, the technique proposed that nonlinear parameter estimation is usable to obtain values of reservoir parameters; however, in the absence of a good initial estimate of model parameters, nonlinear parameter estimation can fail to obtain unique and/or accurate results.

Figure 3:
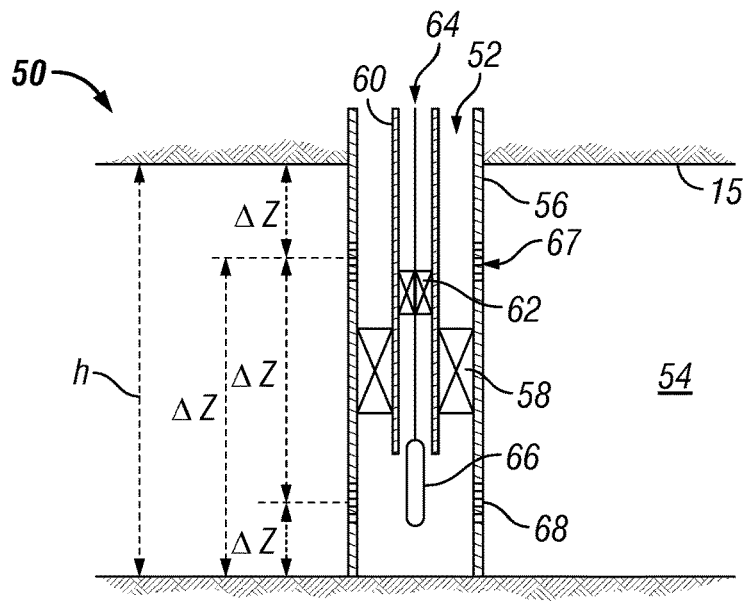
FIG. 3 illustrates a schematic diagram, including a cross-sectional view, of a known well completion system utilized during a known vertical interference test.

A known system and method for determining vertical permeability is found in, for example, "A Method for Determining the Net Vertical Permeability Near a Well From In-Situ Measurements," Prats, JPT, May 1970, 637-643, SPE-251 1-PA and/or "Advances in Well Test Analysis", Earlougher, Monograph Series No. 5, SPE, Dallas, Tex., 1977 (hereinafter "Earlougher I"). As shown in FIG. 3, a well completion system 50, according to Prats and Earlougher I, includes a wellbore 52 which has been drilled into a formation 54 and has casing 56. Within the casing 56 is a casing packer 58 which has tubing 60 extending through the casing packer 58. Inside the tubing is tubing packer 62 which has the wireline cable 64 extending through the tubing packer 62 whereby a pressure gauge 66 is connected to a bottommost end of the wireline cable 64.

The method, according to Prats, proposed withdrawing or injecting fluid through a flow perforation 67, formed in the casing 56, to obtain vertical flow in the formation 54. Furthermore, Prats proposed using an observation perforation 68, formed in the casing 56 and separated from the flow perforation 67 by the casing packer 58, to measure the vertical pressure response for the formation 54. Prats modeled the flow perforation 67 as a point source, only studied the case of a vertical well with 2-dimensional permeability anisotropy, and assumed that the flow perforation 67 produced at a constant rate of flow. The vertical well has an inclination angle, $\theta_w$ in degrees, (as shown in FIG. 1c) from the vertical plane, equal to zero or $\theta_w$=0.

Figure 4:
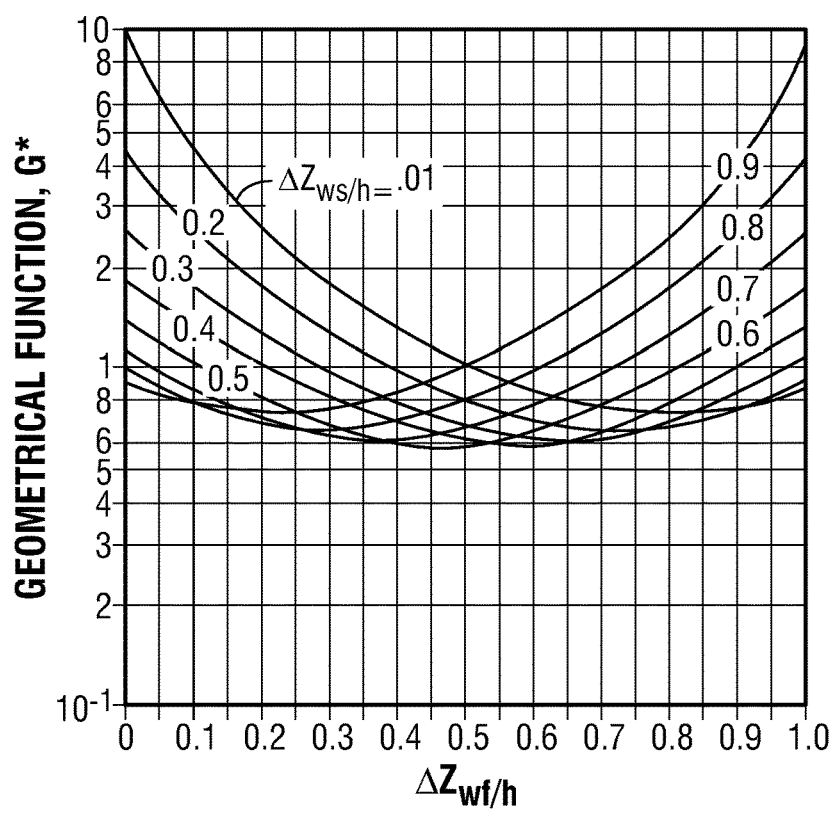
FIG. 4 illustrates a known geometrical function of a known vertical interference test.

During a drawdown test, Prats showed that the late-time, or infinite-acting radial flow, pressure response at the observation perforation 68 due to constant-rate production from the flow perforation was given by $$p_{i,o} - p_{wf,o}(t) = m \log t + b, \tag{1}$$

where $$m = 162.6 \frac{q\mu}{k_h h} \tag{2}$$

and $$b = 162.6 \frac{q\mu}{k_h h} \left[ \frac{G^* + h/|\Delta Z_R|}{2.303} + \log\left(\frac{0.0002637 k_v}{\phi \mu c_t h^2}\right) \right]. \tag{3}$$

where
$p_{i,o}$=initial formation pressure at the observation point, pounds per square inch (hereinafter "psi"),
$p_{wf,o}$=flowing pressure at the observation point, psi,
t=time, hour (hereinafter "hr"),
m=slope of radial-flow plot (absolute value), psi,
b=intercept of radial-flow plot, psi,
q=flow rate, barrels per day (hereinafter "bbl/d"),
μ=viscosity, centipoise (hereinafter "cp"),
$k_h$=horizontal permeability in x- and y-directions of a 2D anisotropic formation, millidarcies (hereinafter "md"),
h=formation thickness, feet (hereinafter "ft"),
G*=geometrical function, dimensionless,
$\Delta Z_R$=distance from the observation perforation to the flow perforation, ft,
$k_v$=vertical permeability in a 2D anisotropic formation, md, and
$c_t$=total compressibility, 1/psi The flow rate, q, is positive for a production period and negative for an injection period. In Eq. 3, G* is a known geometrical function provided by Prats and is shown in FIG. 4. Specifically, FIG. 4 illustrates the known geometrical function; it is provided in, for example, in Earlougher I and also provided in "Analysis and Design Methods for Vertical Well Testing", Earlougher, JPT, March 1980, 505-514, SPE8038-PA (hereinafter "Earlougher II"). G* depends on the position of the production (injection) and measuring perforations (i.e., observation perforation 68) with respect to the vertical boundaries of the reservoir 54. G* is given by $$G^* = \frac{1}{Z + Z'} - 2\ln 2 - \gamma - \frac{1}{2} \sum_{i=1}^{4} \Psi\left(\frac{a_i + 1}{2}\right) \tag{4}$$

where $Z = \Delta Z_{ws}/h$, $Z' = \Delta Z_{wf}/h$, and $$a_1 = 1 + Z + Z'; a_2 = 1 + Z - Z'; a_3 = 1 - Z + Z'; \tag{5}$$
$$a_4 = 1 - Z - Z'.$$

where
z=location of observation perforation, dimensionless,
Z'=location of flow perforation, dimensionless,
γ=Euler's constant, equal to 0.57721 . . . ,
Ψ=digamma function, equal to the logarithmic derivative of the gamma function,
$\alpha_1$-$\alpha_4$=constants used in the digamma function, dimensionless,
$\Delta Z_{wf}$=distance from the bottom of the formation to the flow perforation, ft, and
$\Delta Z_{ws}$=distance from the bottom of the formation to the observation perforation, ft.

Thus, G* is a function of Z and Z', which are the dimensionless positions of the observation and flow perforations 68, 67, respectively. G* is a symmetric function, such that G*(Z, Z')=G*(Z', Z). This property may sometimes be referred to as the "reciprocity principle" which states that the pressure response between two points may be independent of the direction of flow between the two points as provided in, for example, "A Field Application of Pulse-Testing for Detailed Reservoir Description", McKinley et al., JPT, March 1968, 313-321, SPE-1822-PA and provided in "Performance Matching with Constraints", Carter et al., SPEJ, April 1974, 187-196, SPE-4260-PA. The digamma function, Ψ which may also be referred to as the "psi function", in Eq. 4 may be evaluated using an algorithm provided in, for example, "Chebyshev Approximations for the Psi Function", Cody, Mathematics of Computation, January 1973, 123-127.

For a constant-rate test at the flow perforation 67, Eq. 1 indicates that a semilog plot of pressure at the observation perforation 68 vs. time, $p_{wf,o}$ vs. log t, yields a straight line with slope –m and intercept $p_{wf,o}$ (t=1). From these straight-line parameters, the following may be computed:

$$k_h = 162.6 \frac{q\mu}{mh} \tag{6}$$

and $$k_v = \frac{\phi \mu c_t h^2}{0.0002637} 10^{\alpha}. \tag{7}$$

where $$\alpha = \frac{p_{i,o} - p_{wf,o}(t=1)}{m} - \frac{G^* + h/|\Delta Z_R|}{2.303}. \tag{8}$$

where
φ=porosity, fraction, and
α=constant defined by Eq. 8, dimensionless.

Prats developed a method for producing or injecting a well at a constant flow rate. However, it is difficult to maintain a constant production or injection flow rate for a duration of time to complete a test. Thus, a method of testing is to follow the production period with a buildup test. For a buildup test, the wellbore 52 is shut in with a flow rate of q=0. The late-time, or infinite-acting radial flow, buildup pressure response at the observation perforation 68 may be computed from the superposition of two constant-rate drawdown solutions. The result is $$p_{ws,o}(\Delta t) = p_{i,o} - m \log\left(\frac{t_p + \Delta t}{\Delta t}\right). \tag{9}$$

where
$p_{ws,o}$=buildup pressure at the observation point, psi,
Δt=time since start of buildup, hr, and
$t_p$=producing time of constant-rate test, hr.

Another useful form of the superposition equation may be obtained by subtracting the drawdown solution evaluated at time $t=t_p$ from the buildup pressure response, with the result being $$p_{ws,o}(\Delta t) - p_{wf,o}(t_p) = m \log\left(\frac{t_p \Delta t}{t_p + \Delta t}\right) + b. \quad (10)$$

Eq. 9 indicates that a semilog plot of buildup pressure at the observation perforation vs. Horner time, $p_{ws,o}$ vs. log $[(t_p+\Delta t)/\Delta t]$, yields a straight line with slope $-m$ and intercept $p_{i,o}$. Then, $k_h$ may be computed from the slope using Eq. 6. Eq. 10 may be evaluated at any desired value of $\Delta t$, and then solved for $k_v$. A convenient $\Delta t$ may be $\Delta t=1$ hr, and the result is $$k_v = \frac{\phi \mu c_t h^2}{0.0002637} 10^\beta \quad (11)$$

where $$\beta = \frac{p_{ws,o}(\Delta t = 1) - p_{wf,o}(t_p)}{m} - \frac{G^* + h/|\Delta Z_R|}{2.303} + \log(1 + 1/t_p). \quad (12)$$

where $\beta$=constant defined by Eq. 12, dimensionless.

In Eq. 12, $p_{ws,o}$ ($\Delta t=1$) is evaluated from the straight line.

For test conditions that may be more complex than a constant flow rate, or constant flow rate followed by a buildup, the superposition method as demonstrated above may be extended when considering different flow rate conditions, such as, for example, a non-constant flow rate.

In the context of a well-testing system and method, a useable well-testing system and method must satisfy the following requirements to conduct a successful test:

the well or wellbore must have casing and cement must be provided behind the casing;

there must be no communication through the cement behind the casing, for example, Earlougher II sets forth that a micro-annulus with a width as small as 0.001 inch provides enough vertical flow between the flow perforation and observation perforation to cause the appearance of a high vertical permeability;

the flow and observation perforations within the wellbore must not be in communication through the wellbore, which means the perforations must be separated by a casing packer, a plug and/or the like;

the well test must be conducted for a long enough duration of time to achieve radial flow and the pressure response at the observation perforation and must also be large enough to be measured during the well-test duration;

although the method according to Prats was derived for single perforations at the producing location (i.e., at the flow perforation) and observation location (i.e., at the observation perforation), finite-length intervals may be used, and in such case, the producing and observation intervals must be short when compared to the distance between the intervals, such as, for example, about 10% or less than the distance between the intervals; and the analysis method according to Prats is based on an assumption of a zero-radius (i.e., line-source) well and for the method to apply to a finite-radius wellbore, $$|\Delta Z_R| > 25 r_w \sqrt{k_v/k_h}. \quad (13)$$

where $r_w$=wellbore radius, ft

Earlougher II sets forth that simulations showed that the constant in Eq. 13 may be relaxed to about "12" instead of "25". Prats only studied the case of a vertical well (i.e. $\theta_w=0$) with the flow perforation 67 producing at a constant rate of flow. Additionally, Prats only presented one example and did not state if such example utilized real data or synthetic data. Moreover, the computation of vertical permeability for the example case in Prats was in error, and the corrected value of the vertical permeability for the example case of Prats was set forth in Earlougher II.

The IPTT test utilizing the tool 16 and/or the first probe 20, as illustrated in FIGS. 1a-1c, may satisfy one or more of the above-identified requirements. The IPTT test may be conducted in open hole; thus, the requirements for casing and good cement may be replaced by a requirement for a sealing mudcake and/or the like. The sealing mudcake should be sufficient to prevent pressure communication between the wellbore 12 and reservoir 14. For an IPTT test in which the tool 16 is a dual-packer tool, the length of the flowing interval of the dual-packer tool should not exceed 10% of the distance between the packer and first probe 20 of the tool 16. Additionally, for an IPTT test in which the tool 16 is single-probe tool or a dual-packer tool, the above-identified requirements set forth in Eq. 13 should be satisfied by the configuration of the tool 16 and/or the first probe 20 and the configuration of the wellbore 12 and/or the radius, $r_w$, of the wellbore 12.

Figure 5:
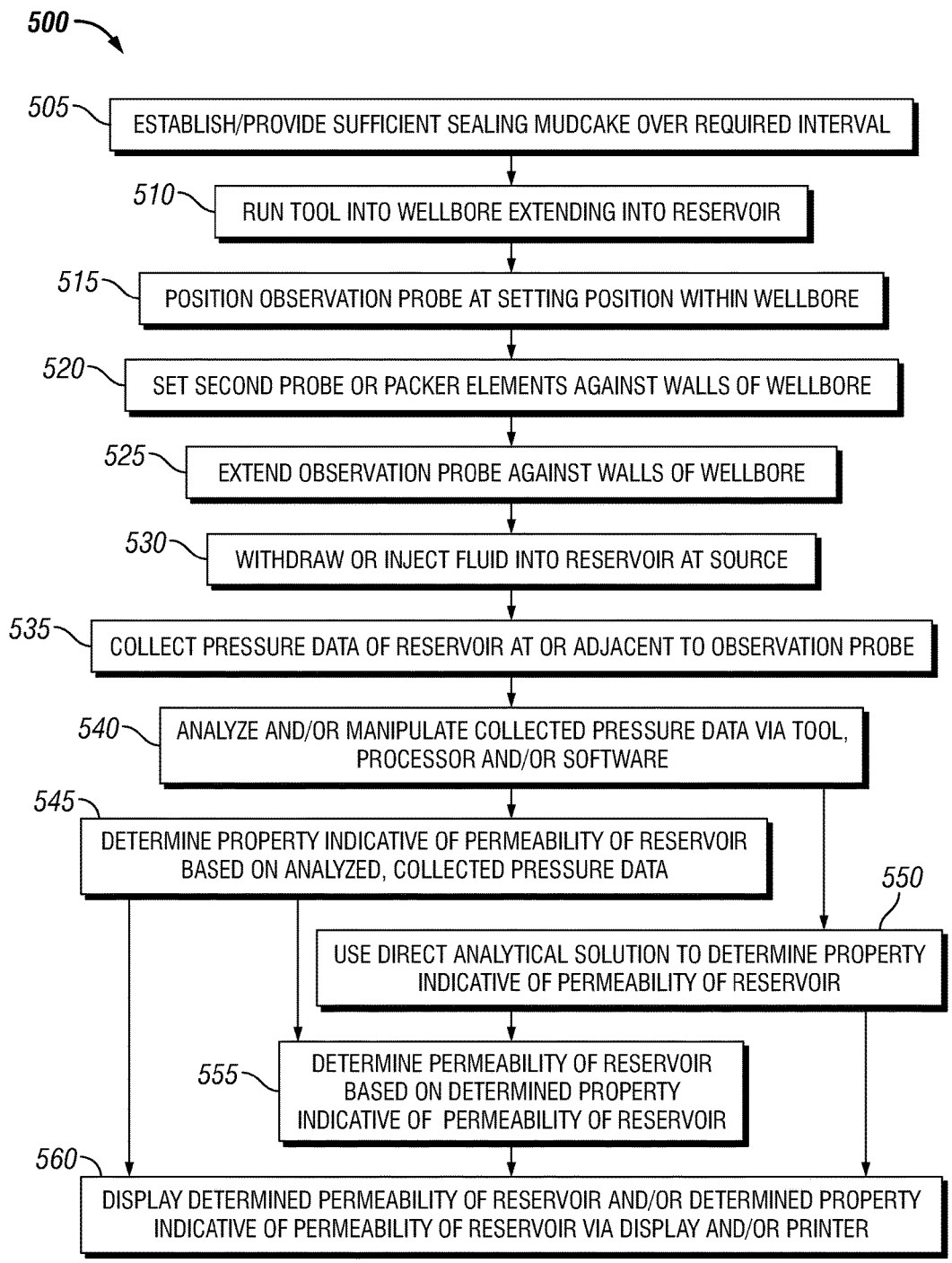
FIG. 5 illustrates a flowchart of a method for collecting and analyzing data collected by a formation testing tool during a formation test in accordance with an embodiment.

FIG. 5 illustrates a method 500 for determining the permeability and/or the one or more properties indicative of permeability of the reservoir 14 by collecting and analyzing the pressure data via the first probe 20 and/or the tool 16 during a formation test, such as, for example, an IPTT test of the reservoir 14. Initially, a sealing mudcake that is sufficient should be provided within the wellbore 12. The sealing mudcake is considered to be sufficient if the sealing mudcake prevents pressure communication between the wellbore 12 and reservoir 14. The sealing mudcake should extend over a required interval extending from at least the setting position 22 of the first probe 20 to the tool 16. If a sealing mudcake is not sufficient over this required interval, then the sealing mudcake should be sufficiently established and/or provided over this interval, as shown at step 505, so that the IPTT test may be conducted with the tool 16 positioned within the wellbore 12.

The tool 16 is run into the wellbore 12, as shown at step 510, such that the first probe 20 of the tool 16 may be positioned at the setting position 22 within the wellbore 12 as shown at step 515. The tool 16 begins the formation test by setting and/or extending the second probe 24 (see FIG. 1a) or the packer elements 26a, 26b (see FIGS. 1b and 1c) against the walls 18 of the wellbore 12 and/or reservoir 14 as shown at step 520 in FIG. 5. The tool 16 extends the first probe 20 outward with respect to the tool 16 until the first probe 20 is against adjacent to, abuts and/or penetrates the walls 18 of the wellbore 12 and/or the reservoir 14 at the setting position 22 of first probe 20 as shown at step 525. The source, such as, for example, the second probe 24 or the dual packer withdraws or injects fluid into the reservoir 14 as shown at step 530. The tool 16 and/or the first probe 20 measures pressure data (hereinafter "collected data") of the reservoir 14 at the setting position 22 of the first probe 20 as shown at step 535. The collected data is analyzed, evaluated and manipulated by the tool 16, the software 108 and/or the processor 104 as shown at step 540. In embodiments, the collected data is displayable to and/or reviewable by the operator via the display 116 and/or a printer 118, either in real time during the formation test or after the tool 16 has been pulled from the wellbore 12. The printer 118 is connected to and/or in electrical communication with the processor 104 as shown in FIG. 2.

The permeability and/or the one or more properties indicative of the permeability of the reservoir 14 may be calculated, computed and/or determined by the tool 16, the processor 104 and/or the software 108 based on the analyzed, collected data as shown at step 545. For example, the determined permeability and/or the determined one or more properties indicative of the permeability of the reservoir 14 at or adjacent to the setting position 22 of the first probe 20 may be: formation mobility, such as, for example, vertical mobility and/or horizontal mobility; horizontal formation permeability of a 2D anisotropic formation or reservoir; horizontal formation permeability in the x-direction and/or the y-direction of a 3D anisotropic formation or reservoir; and/or vertical formation permeability of a 2D or 3D anisotropic formation or reservoir. In embodiments, the permeability and/or the one or more properties indicative of the permeability of the reservoir 14 may be determined by the tool 16, the processor 104 and/or the software 108 based on the determined radial-flow response for the reservoir 14 at or adjacent to the setting position 22 of the first probe 20. The determined permeability and/or the one or more properties indicative of the permeability may be displayable and/or reviewable by the operator via the display 116 and/or the printer 118, either in real time during the formation test or any time thereafter, such as when the tool 16 has been pulled from the wellbore 12 as shown at step 560.

In embodiments, a direct analytical solution and/or a graphical method is utilized to determine the permeability and/or the one or more properties indicative of the permeability of the reservoir 14 as shown at step 550. Advantageously, the direct analytical and/or graphical method determines permeability of a property indicative of permeability without an iterative method requiring an initial estimate as required in U.S. Pat. No. 7,277,796. The direct analytical solution and/or the graphical method for determining the permeability and/or the one or more properties indicative of the permeability of the reservoir is based on the obtained pressure data and/or a graphical interpretation of the analyzed pressure data. The direct analytical solution and the graphical method for determining the permeability and/or the one or more properties are discussed hereinafter. The one or more properties determined by the direct analytical solution and/or the graphical method are reviewable and displayable via the display 116 and/or the printer 118 as shown at step 560. The horizontal permeability and/or the vertical permeability of the reservoir 14 may be determined by the tool 16, the processor 104 and/or the software 108 based on the determined one or more properties indicative of the permeability of the reservoir 14 as shown at step 555. Moreover, the determined horizontal permeability and/or the vertical permeability of the reservoir 14 is reviewable and/or displayable via the display 116 and/or the printer 118 as shown at step 560.

Six synthetic cases were prepared and analyzed by simulation software stored in a storage medium of a processor, such as, for example, the software 108 stored in the storage medium 110 of the processor 104. The six synthetic cases were generated with an MdtDualProbe simulation program (hereinafter "MdtDualProbe") or MdtPackerProbe simulation program (hereinafter "MdtPackerProbe").

MdtDualProbe is a software package for estimation of reservoir parameters from pressure/rate data acquired by the MDT single-probe and multiprobe tools. MdtDualProbe uses analytical solutions given by Kuchuk, F. J.: "Multi-probe Wireline Formation Tester Pressure Behavior in Crossflow-Layered Reservoirs," IN SITU, 20 (1), 1996, 1-40, for generating model sink, horizontal and observation probe pressures. MdtDualProbe models a vertical well producing in an infinite transversely isotropic reservoir with closed top and bottom boundaries.

MdtPackerProbe is a software package for estimation of reservoir parameters from pressure/rate data acquired by the MDT packer-probe tool. MdtPackerProbe uses analytical solutions given by: (1) Kuchuk, F. J.: "Pressure Behavior of MDT Packer Module and DST in Crossflow-Multilayer Reservoirs," Journal of Petroleum Science and Engineering, 11 (1994) 123-135; (2) Kuchuk, F. J.: "Multiprobe Wireline Formation Tester Pressure Behavior in Crossflow-Layered Reservoirs," IN SITU, 20 (1), 1996, 1-40; (3) Kuchuk, F. J., Ramakrishnan, T. S., and Dave, Y.: "Interpretation of Wireline Formation Tester Packer and Probe Pressures", paper SPE 28404 presented at the SPE's 69th Annual Technical Conference and Exhibition, New Orleans, 1994; (4) Kuchuk, F. J., Habashy, T.: "Pressure Behavior of Horizontal Wells in Multilayer Reservoirs With Crossflow," SPE Formation Evaluation, March 1996, 55-64; (5) Kuchuk, F. J.: "Interval Pressure Transient Testing With MDT Packer-Probe Module in Horizontal Wells," SPE Formation Evaluation, December 1998, 509-518; and (6) 12. Abbaszadeh, M. and Hegeman, P.: "Pressure-Transient Analysis for a Slanted Well in a Reservoir With Vertical Pressure Support," SPEFE (September 1990) 277. MdtPackerProbe uses the analytical solutions for generating model packer interval and observation probe pressures. MdtPackerProbe models vertical, horizontal, and inclined wells producing in an infinite transversely isotropic reservoir with closed top and bottom boundaries.

The correspondence between terminology according to Prats and the terminology illustrated in FIGS. 1a-1c is $\Delta Z_{wf}=z_w$, $\Delta Z_{ws}=z_w+z_o$, and $\Delta Z_R=z_o$, and, for the six synthetic cases the wellbore is vertical.

Synthetic Case 1: Example in Accordance with Prats, Flowing Through a Single-Probe Tool.

Synthetic Case 1 was generated with the MdtDualProbe program using input data in accordance with Earlougher I. The input data were h=50 ft, $k_h$=7.2 md, $k_v$=4.3 md, $z_w$=45 ft, $z_o$=−35 ft, μ=1 cp, φ=0.1, $c_t$=2e-5 1/psi, and $p_{i,o}$=3015 psi. The MdtDualProbe program requires additional data inputs of probe size and wellbore radius; probe radius $r_p$=1.12 inches (hereinafter "in"), and wellbore radius, $r_w$=0.25 ft, were used. In the example according to Prats, a 200-hr injection at 50 bbl/d was used, and the injection period was analyzed. For Synthetic Case 1 generated with the MdtDualProbe program, a 100-hr flow at 50 bbl/d followed by a 100-hr buildup was modeled, and the buildup was analyzed. For this synthetic case, $|\Delta Z_R|$=35 ft and $25 r_w \sqrt{k_v/k_h}$=4.8 ft, Thus, the requirement of Eq. 13 is satisfied.

Figure 6A:
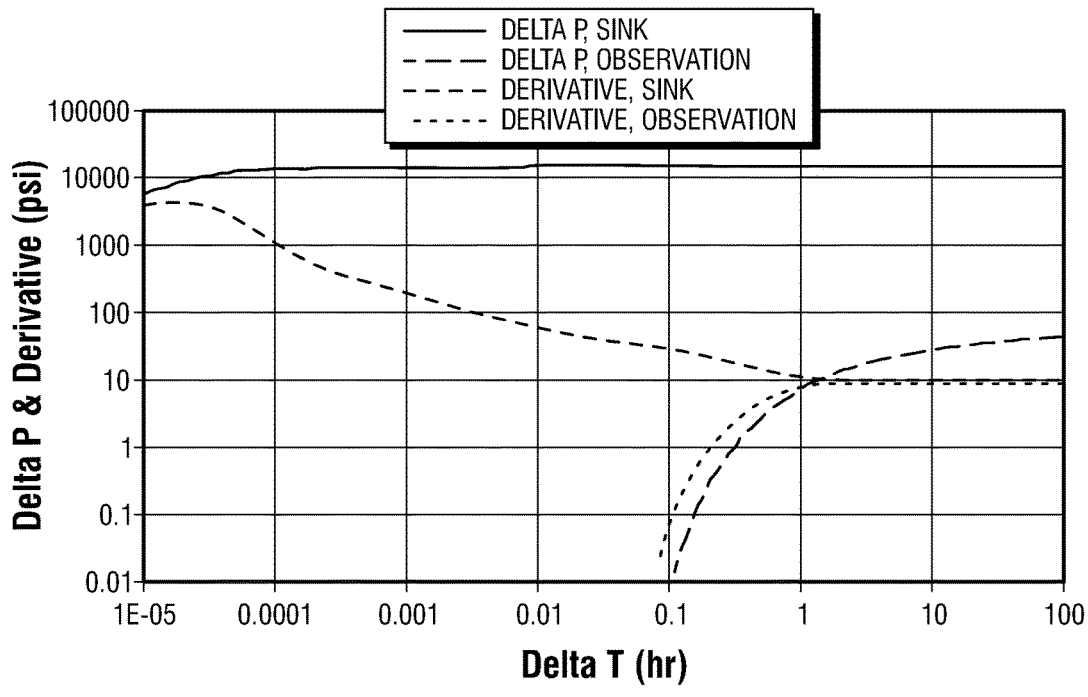
FIG. 6a illustrates a graph showing pressure change and derivative plots for a buildup test flowing through a single-probe formation testing tool in accordance with an embodiment.
Figure 6B:
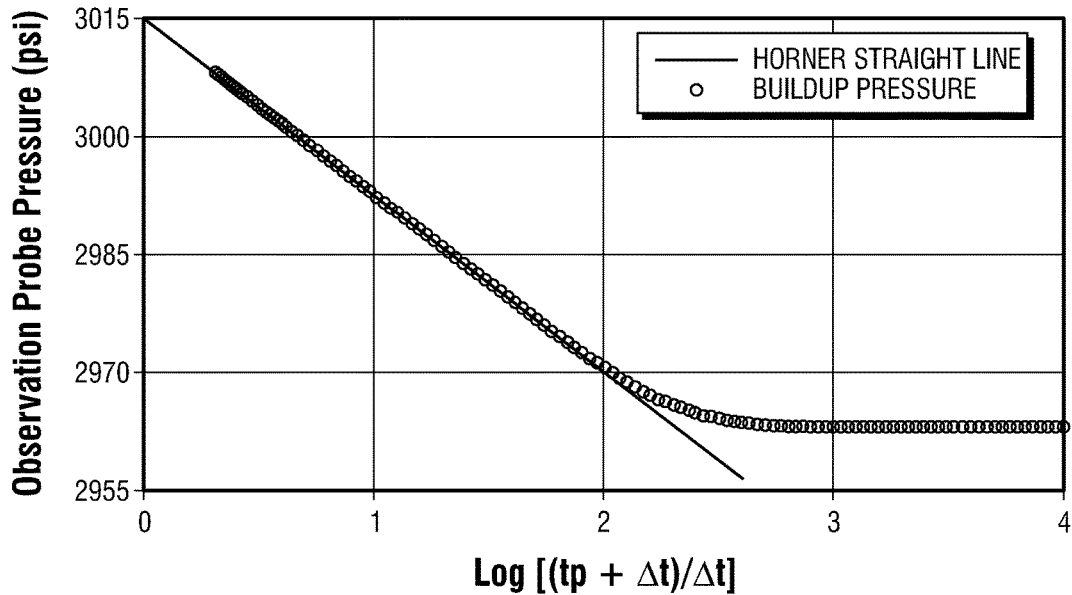
FIG. 6b illustrates a graph showing a Horner analysis for a buildup test flowing through a single-probe formation testing tool in accordance with an embodiment.

Pressure derivative and Horner plots for the buildup are presented in FIGS. 6a and 6b. The sink response is included in the derivative plot for reference, but the sink response was not used in the analysis. The sink response shows that a pressure drop in excess of 15,000 psi would be required to flow 50 bbl/d from the first probe 20, which may suggest that the example according to Prats is either synthetic or involved many injecting perforations rather than a single perforation 67. The system reaches radial flow after 2 hours (hereinafter "hrs") of buildup. Using Horner straight line parameters, $k_h$ is computed from Eq. 6 and $k_v$ is computed from Eq. 11. The values are displayed on FIG. 6b and are substantially identical to the values input to the MdtDual-Probe program. Thus for this synthetic example the method of Prats may be used to analyze data collected by the first probe 20 during an IPTT test for the reservoir 14 and a radial flow regime of the reservoir 14.

Synthetic Case 2: Example Accordance with Prats, Flowing Through a Dual-Packer Tool.

Synthetic Case 2 was generated with the MdtPackerProbe program using the same input data as Synthetic Case 1, except that the single-probe tool was replaced with a dual-packer tool having $l_w$=1.6 ft. For Synthetic Case 2, the length of the flowing interval of the dual-packer tool is 2 $l_w$=3.2 ft, which meets the requirement of being less than 3.5 ft, which is 10% of $|\Delta Z_R|$.

Figure 7A:
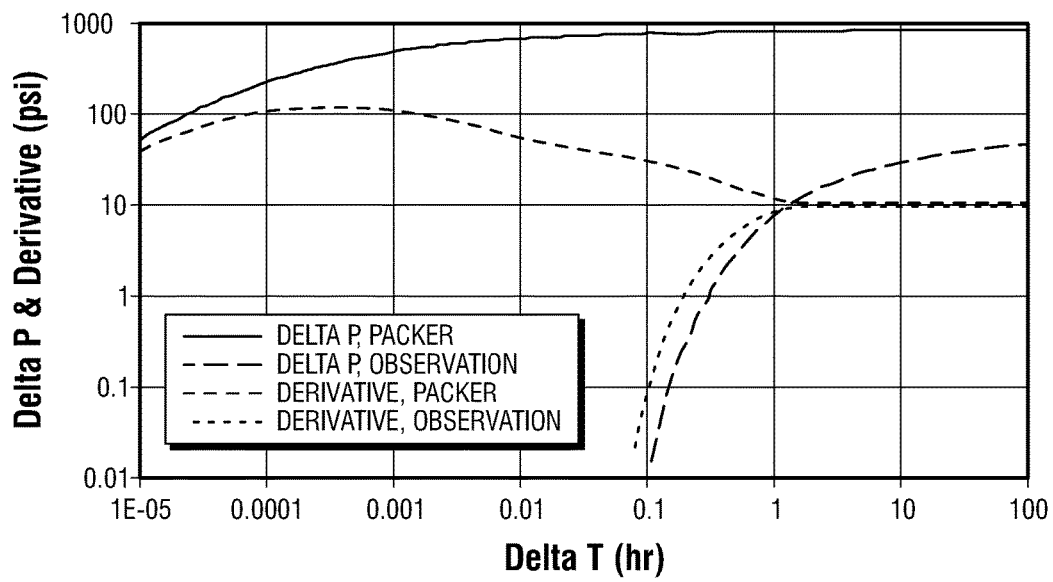
FIG. 7a illustrates a graph showing pressure change and derivative plots for a buildup test flowing through a dual-packer formation testing tool in accordance with an embodiment.
Figure 7B:
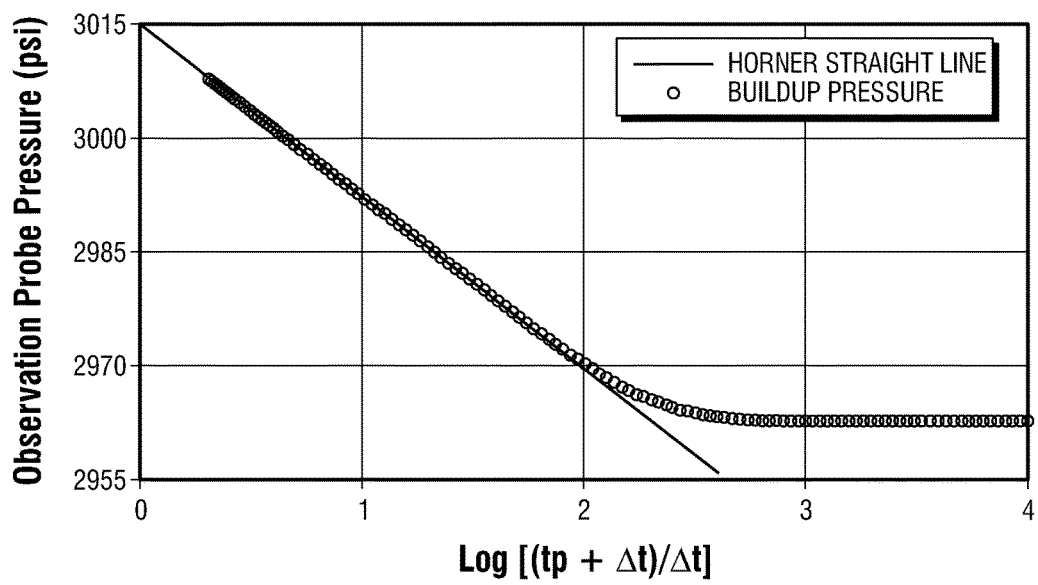
FIG. 7b illustrates a graph showing a Horner analysis for a buildup test flowing through a dual-packer formation testing tool in accordance with an embodiment.

Pressure derivative and Horner plots for the buildup are presented in FIGS. 7a and 7b. The dual-packer response is included in the derivative plot for reference, but the dual-packer response was not used in the analysis. The dual-packer response shows that a pressure drop of less than 1000 psi would be required to flow 50 bbl/d from the flowing interval of the dual-packer tool, which is reasonable. The system of Synthetic Case 2 reaches radial flow after 2 hours. Using the Horner straight line parameters, $k_h$ is computed from Eq. 6 and $k_v$ is computed from Eq. 11. The values are displayed on FIG. 7b. The values are substantially identical to the values initially input to the MdtPackerProbe program. Thus, Synthetic Case 2 validates the application of the method according to Prats with respect to data collectable by the first probe 20 during an IPTT test. The radial-flow response was substantially identical to the radial-flow response of Synthetic Case 1 which may indicate that when the first probe 20 is far from the source of flow, the nature of the source (i.e., a sink-probe source or a dual-packer source) may not substantially affect the radial-flow response.

Synthetic Cases 1 and 2 are based on the parameters according to the example of Prats and are not representative of formation tester (e.g., MDT) IPTT tests. In particular, $|\Delta Z_R|$=35 ft is nearly an order of magnitude larger than a typical IPTT test. The next four synthetic cases, two synthetic cases with a sink probe as the flow source and two with a dual-packer as the flow source, are considered to be more representative of formation tester IPTT tests.

Synthetic Case 3: MDT Flowing Through a Single-Prove Tool, with $k_h > k_v$.

Synthetic Case 3 was generated with the MdtDualProbe program using the following input data: h=20 ft, $k_h$=100 md, $k_v$=10 md, $z_w$=8 ft, $z_o$=2.3 ft, $\mu$=0.5 cp, $\phi$=0.2, $c_t$=8e-6 1/psi, $p_{i,o}$=5000 psi, $r_p$=0.22 in, and $r_w$=0.25 ft. The test sequence comprised a 2-hr flow at 14 bbl/d followed by a 2-hr buildup. For this synthetic case $\Delta Z_R$=2.3 ft and $25r_w\sqrt{k_v/k_h}$=1.98 ft. Thus, the requirement of Eq. 13 is satisfied.

Figure 8A:
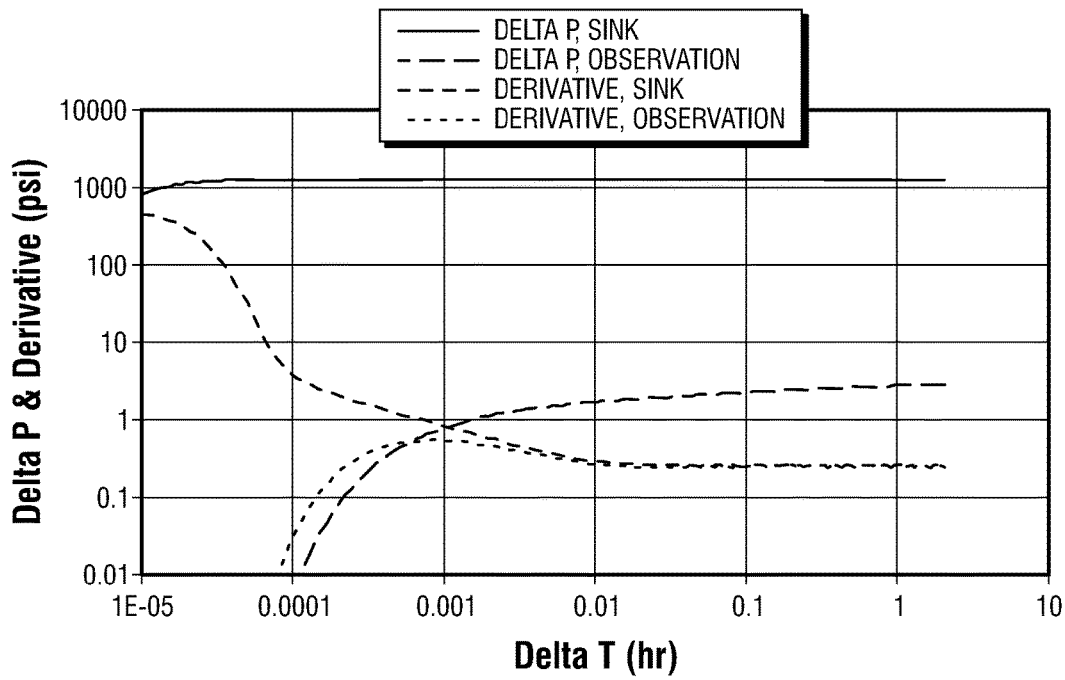
FIG. 8a illustrates a graph showing pressure change and derivative plots for a buildup test flowing through a single-probe formation testing tool in accordance with an embodiment.
Figure 8B:
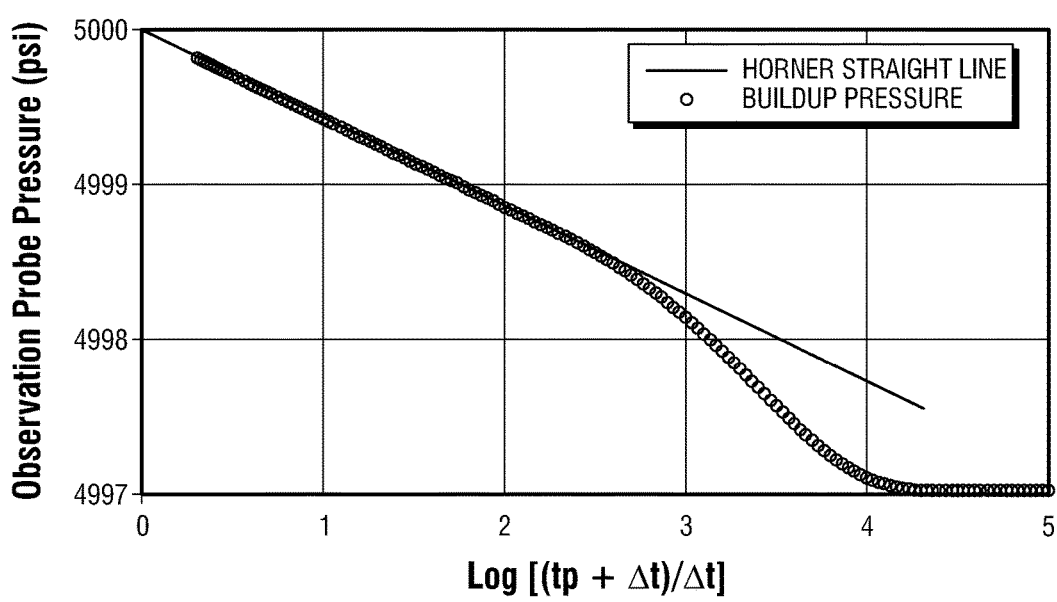
FIG. 8b illustrates a graph showing a Horner analysis for a buildup test flowing through a single-probe formation testing tool in accordance with an embodiment.

Pressure derivative and Horner plots for the buildup are presented in FIGS. 8a and 8b. The sink response is included for reference. The system reaches radial flow after 0.02 hours of buildup. Values for $k_h$ and $k_v$ are computed from the Horner straight line and are shown on FIG. 8b; the value of $k_h$ substantially matches the value input into the MdtDual-Probe program; however, there is a slight error of 2.2% in the computed value of $k_v$ when compared to the value input to the MdtDualProbe program.

Synthetic Case 4: MDT Flowing Through a Dual-Packer Tool, with $k_h > k_v$.

Synthetic Case 4 was generated with the MdtPackerProbe program using the same input data as Synthetic Case 3, except that the single-probe tool was replaced with a dual-packer tool having l=1.6 ft and the observation first probe 20 was placed at $z_o$=6.2 ft. For Synthetic Case 4, $\Delta Z_R$=6.2 ft and $25r_w\sqrt{k_v/k_h}$=1.98 ft. Thus, the requirement of Eq. 13 is satisfied. However, the length of the flowing interval is 2 $l_w$=3.2 ft, which does not meet the requirement of being less than 0.62 ft, which is 10% of $\Delta Z_R$. Moreover, the flowing interval length of the dual-packer tool exceeds 50% of $\Delta Z_R$.

Figure 9A:
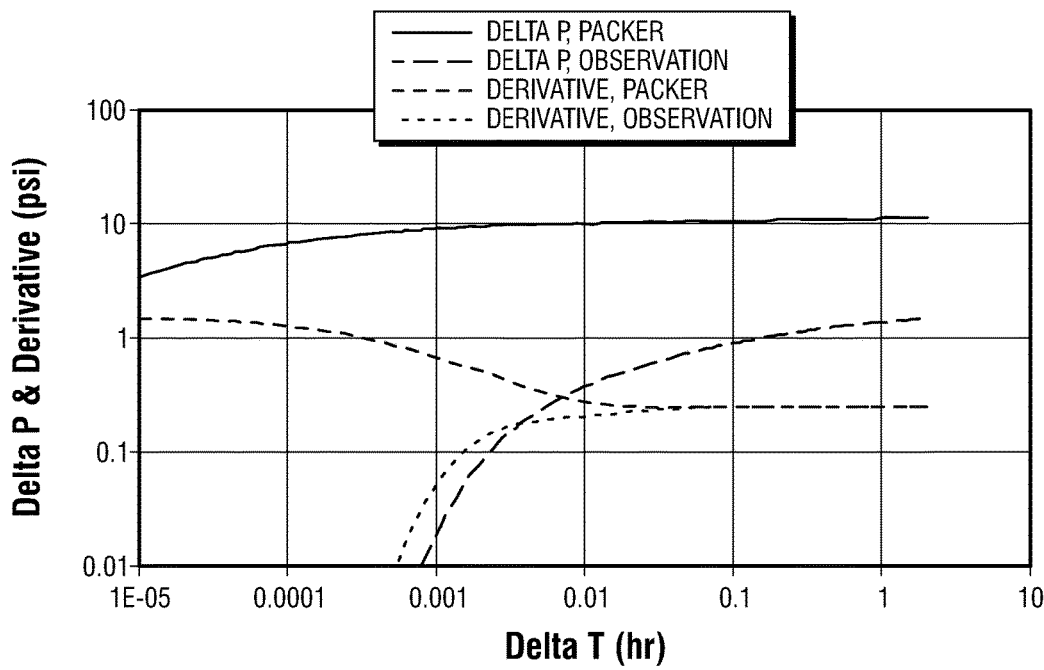
FIG. 9a illustrates a graph showing pressure change and derivative plots for a buildup test flowing through a dual-packer formation testing tool in accordance with an embodiment.
Figure 9B:
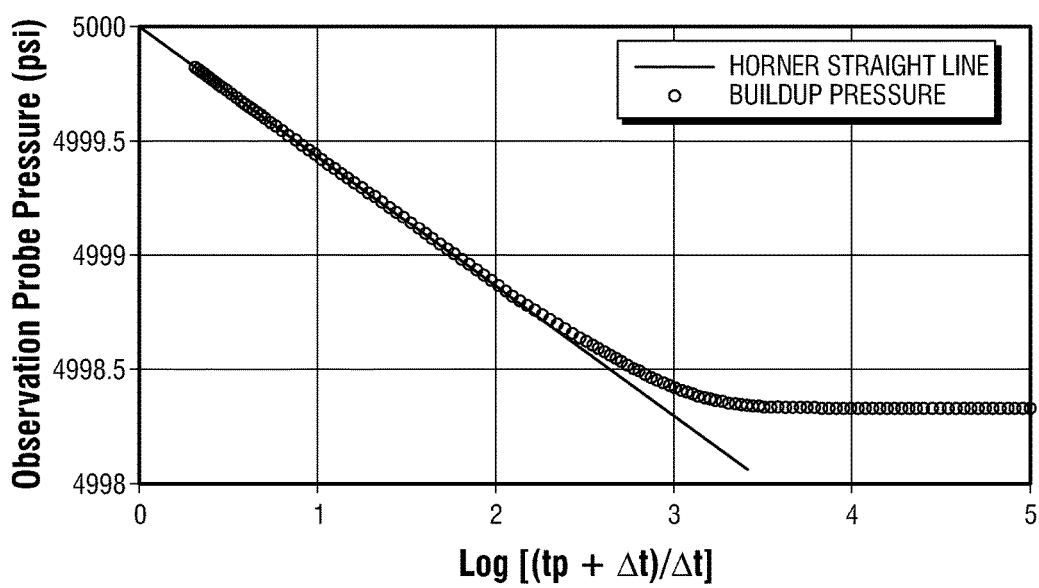
FIG. 9b illustrates a graph showing a Horner analysis for a buildup test flowing through a dual-packer formation testing tool in accordance with an embodiment.

Pressure derivative and Horner plots for the buildup are presented in FIGS. 9a and 9b. The dual-packer response is included for reference. The system of Synthetic Case 4 reaches radial flow after 0.03 hours. The $k_h$ and $k_v$ values are computed from the Horner straight line and are displayed on FIG. 9b; the computed value of $k_h$ substantially matches the value input into the MdtPackerProbe program, while the computed $k_v$ value is in error by about 8.4%. The error for the computed $k_v$ is caused by the length of the flowing interval of the dual-packer tool substantially exceeding the limit proposed by Prats of 10% of $\Delta Z_R$. Nevertheless, an error of 8.4% in the computed $k_v$ value may be considered acceptable to one of ordinary skill in the art.

Synthetic Case 5: MDT Flowing Through a Single-Probe Tool, with $k_h < k_v$.

Synthetic Case 5 was generated with the MdtDualProbe program using the same input data as Synthetic Case 3, except the permeabilities were changed to $k_h$=25 md and $k_v$=50 md. For Synthetic Case 5, $\Delta Z_R$=2.3 ft and $25r_w\sqrt{k_v/k_h}$=8.84 ft. Thus, the requirement of Eq. 13 is not met; moreover, even by relaxing the constant 25 to the constant 12 as proposed by Earlougher I, the requirement of Eq. 13 is still not satisfied.

Figure 10A:
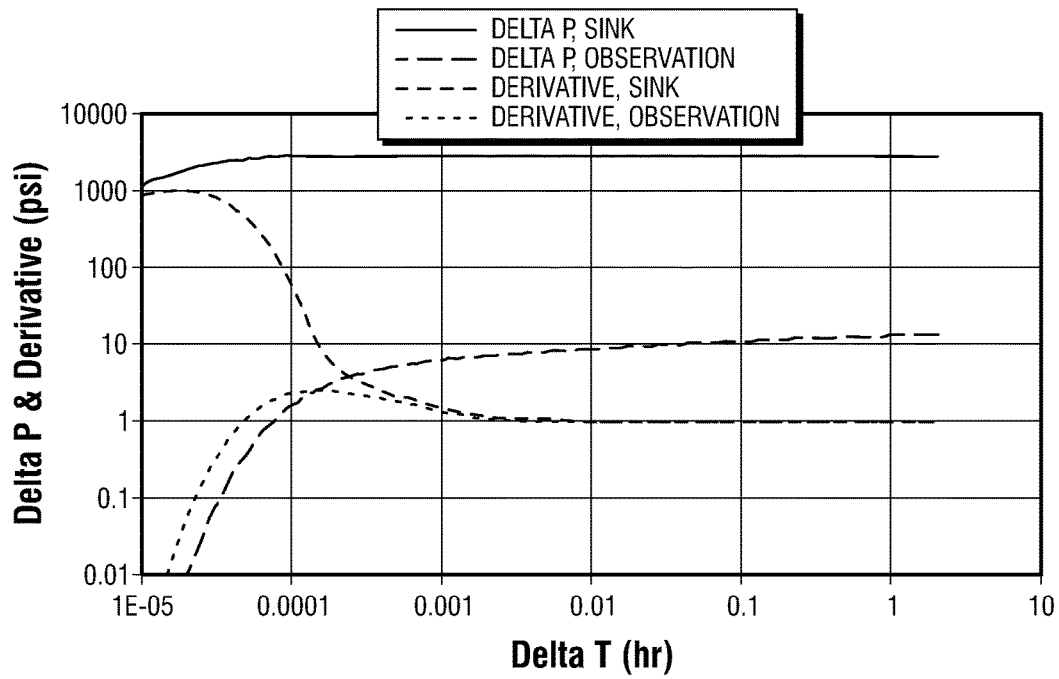
FIG. 10a illustrates a graph showing pressure change and derivative plots for a buildup test flowing through a single-probe formation testing tool in accordance with an embodiment.
Figure 10B:
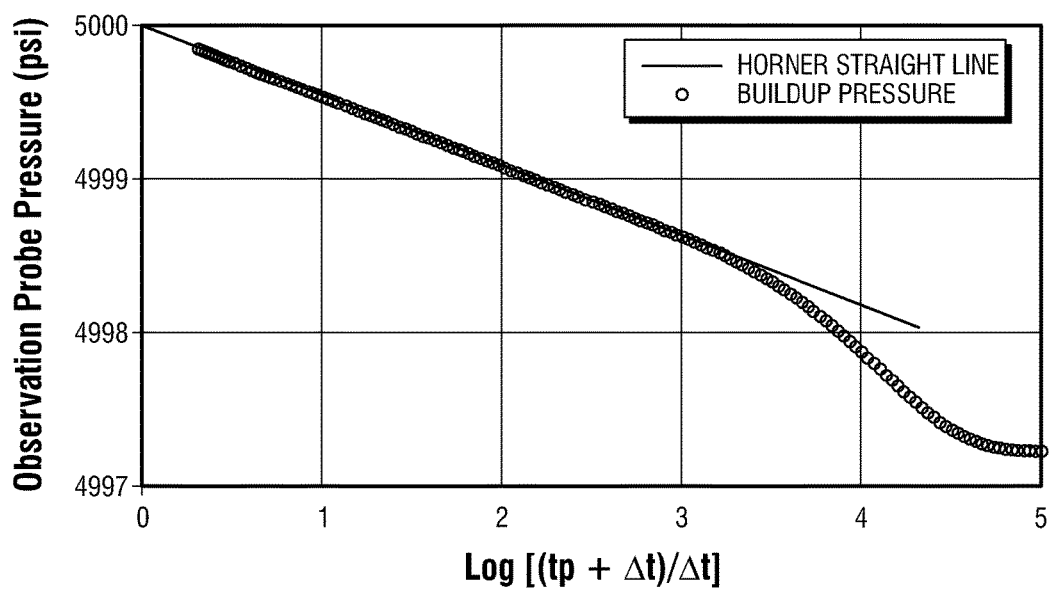
FIG. 10b illustrates a graph showing a Horner analysis for a buildup test flowing through a single-probe formation testing tool in accordance with an embodiment.

Pressure derivative and Horner plots for the buildup are presented in FIGS. 10a and 10b. The system of Synthetic Case 5 reaches radial flow after 0.005 hours. The $k_h$ and $k_v$ values are computed from the Horner straight line and are shown on FIG. 10b; and the computed $k_h$ value substantially matches the value input to the MdtDualProbe program, while the computed $k_v$ value is in error by about 31%. The error associated with the computed $k_v$ is caused by failure to meet the requirement of Eq. 13. That is, with $k_h < k_v$ by a large amount, and there is not enough separation between the probes when $z_o$ =2.3 ft.

Figure 10C:
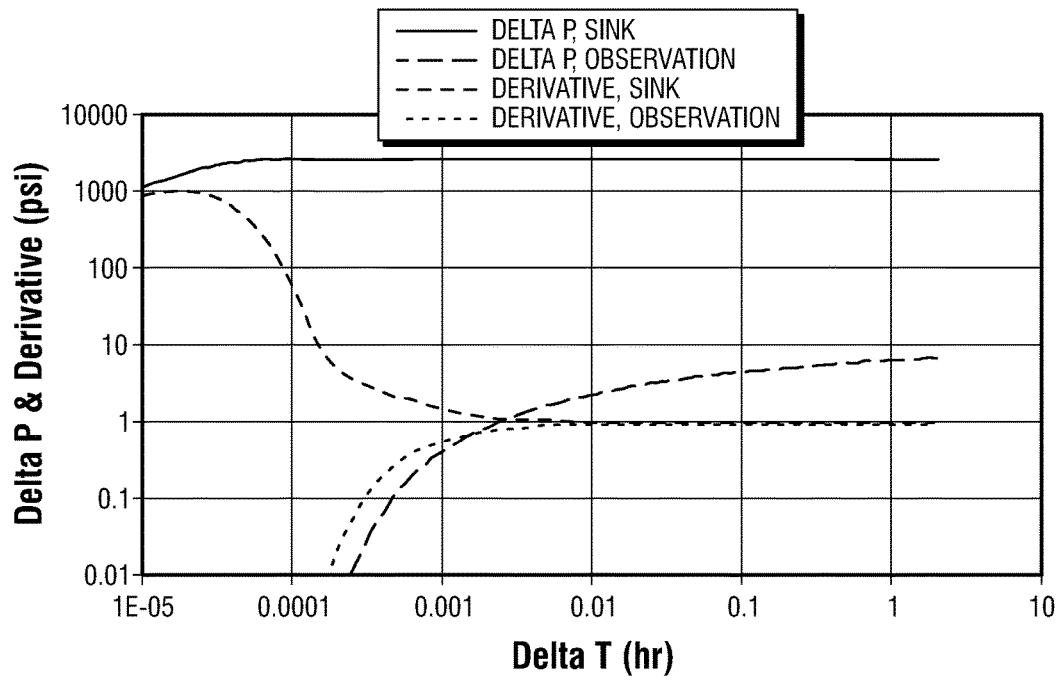
FIG. 10c illustrates a graph showing pressure change and derivative plots for a buildup test flowing through a single-probe formation testing tool in accordance with an embodiment.
Figure 10D:
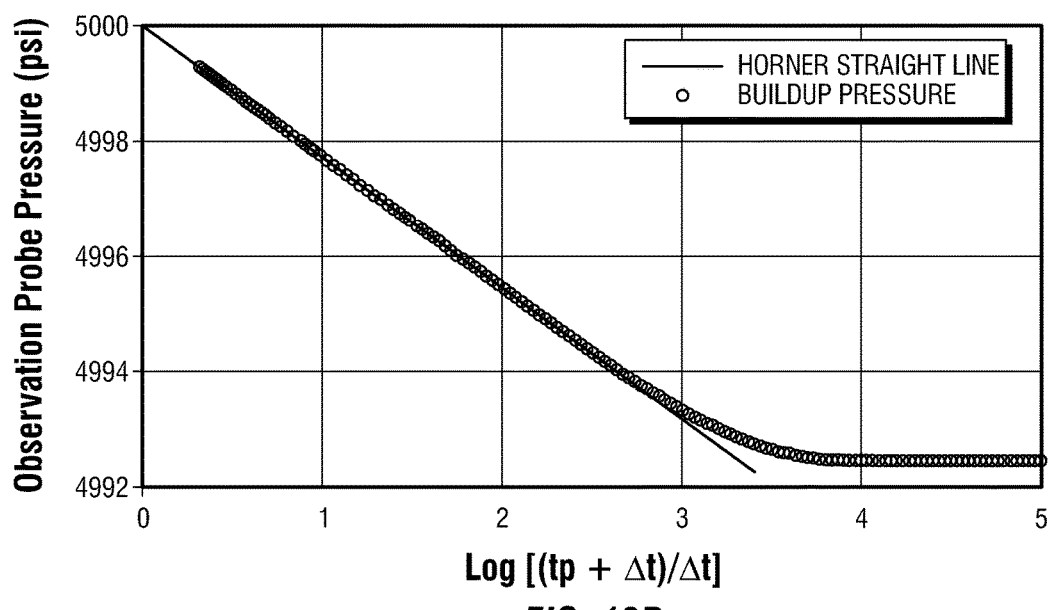
FIG. 10d illustrates a graph showing a Horner analysis for a buildup test flowing through a single-probe formation testing tool in accordance with an embodiment.

Synthetic Case 5 was executed again with a value for $z_o$ o=$\Delta Z_R$=7.9 ft, which value is substantially representative of an observation probe spacing for a test conducted with two single-probe tools, as opposed to a dual-probe/single-probe combination which was the basis for $z_o$ =2.3 ft. With $z_o$ =7.9 ft, the requirement of Eq. 13 is substantially satisfied, and the requirement of Eq. 13 is satisfied if the constant 25 is relaxed to the constant 12 as proposed by Earlougher I. Pressure derivative and Horner plots are shown in FIGS. 10c and 10d; Horner analysis yields a computed value of $k_v$ =49.5 md, which is about 1% in error of the value input to the MdtDualProbe program for the $k_v$ value.

Synthetic Case 6: MDT Flowing Through a Dual-Packer Tool, with kh<kv

Synthetic Case 6 was generated with the MdtPackerProbe program using the same input data as Synthetic Case 5, except that the single-probe tool was replaced by a dual-packer tool having $l_w$=1.6 ft and the observation probe was placed at $z_o$=6.2 ft. For Synthetic Case 6, $\Delta Z_R$=6.2 ft and $25r_w\sqrt{k_v/k_h}$=8.84 ft. Thus, the requirement of Eq. 13 is not satisfied; however, it is satisfied if the constant 25 is relaxed to the constant 12 as proposed by Earlougher I. The length of the flowing interval of the dual-packer tool is 3.2 ft, which does not meet the requirement of being less than 0.62 ft, which is 10% of $\Delta Z_R$. Moreover, the flowing-interval length exceeds 50% of $\Delta Z_R$.

Figure 11A:
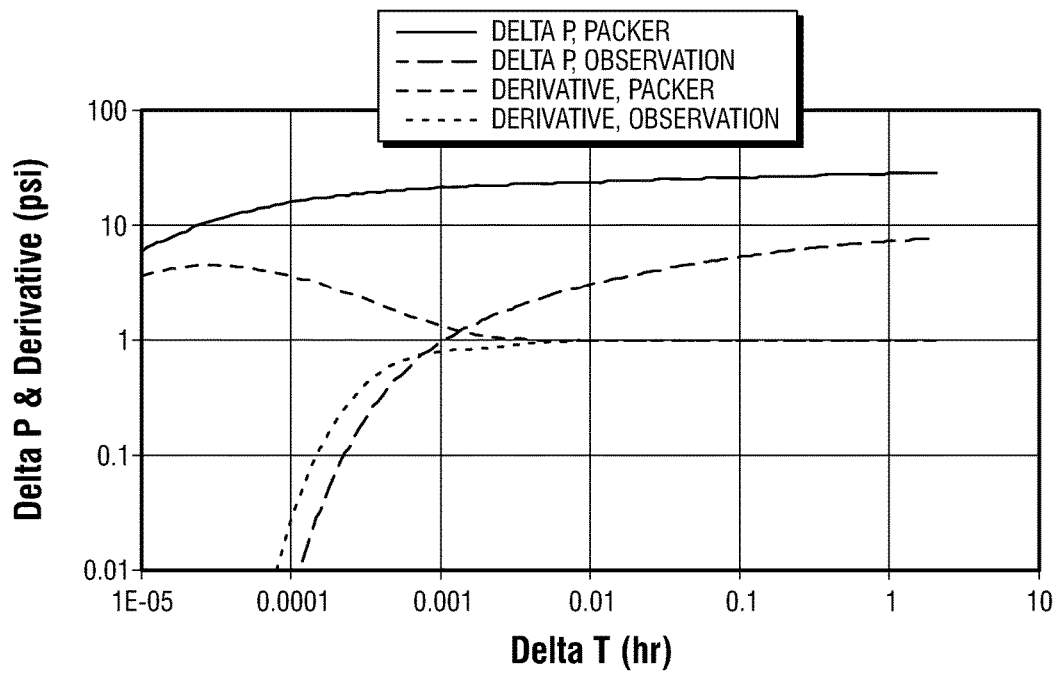
FIG. 11a illustrates a graph showing pressure change and derivative plots for a buildup test flowing through a dual-packer formation testing tool in accordance with an embodiment.H
Figure 11B:
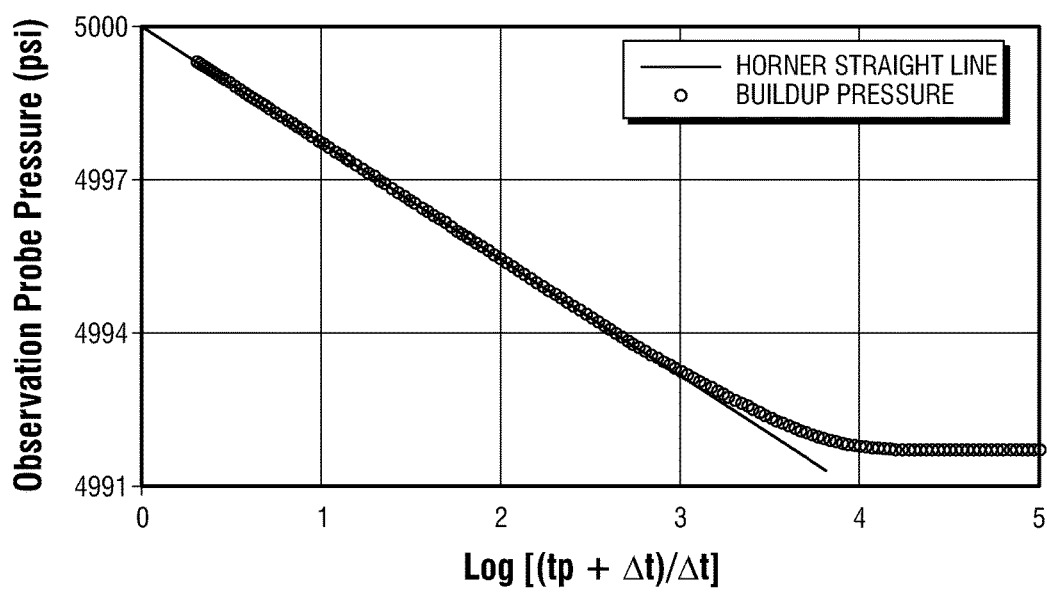
FIG. 11b illustrates a graph showing a Horner analysis for a buildup test flowing through a dual-packer formation testing tool in accordance with an embodiment.

Pressure derivative and Horner plots for the buildup are displayed in FIGS. 11a and 11b. The system of Synthetic Case 6 reaches radial flow after 0.005 hours, and Horner analysis results for $k_h$ and $k_v$ are shown on FIG. 11b. The computed $k_h$ value substantially matches the value input to the MdtPackerProbe program; however, the calculated $k_v$ value is in error by about 8.2%. The magnitude of the error for the calculated $k_v$ value is similar to that exhibited in Synthetic Case 4, which may suggest that the error is caused by the length of the flowing interval substantially exceeding the limit proposed by Prats. Thus, it does not appear as if the slight error in satisfying the requirement of Eq. 13 had any substantial effect with respect to the error in the calculated $k_v$ value.

Prats developed his method for vertical wells and/or reservoirs having 2D permeability anisotropy. The systems and methods of the present disclosure may be utilized with an inclined wellbore, such as, the wellbore 12, in a reservoir, such as reservoir 14 shown in FIG. 1c, with 3D permeability anisotropy. The wellbore inclination, $\theta_w$, can range from 0 (vertical well) to 90 degrees (horizontal well), and the wellbore may have portions that are vertical, portions that are horizontal and portions that are inclined at an angle between 0 and 90 degrees. The following transformations are based on the work provided in, for example, Besson, J.: "Performance of Slanted and Horizontal Wells on an Anisotropic Medium," paper SPE 20965 presented at the 1990 SPE European Petroleum Conference, The Hague, Netherlands, 22-24 October. Eq. 1 may be adapted for wellbore inclination and 3D permeability anisotropy as follows:

$$\bar{k} = k_s = \sqrt[3]{k_h^2 k_v}. \tag{14}$$

$$\bar{x} = \alpha_x x. \tag{15}$$

$$\bar{y} = \alpha_y y. \tag{16}$$

$$\bar{z} = \alpha_z z. \tag{17}$$

$$\bar{h} = \alpha_z h. \tag{18}$$

$$\bar{l}_w = \alpha_z \delta l_w. \tag{19}$$

$$\bar{z}_o = \alpha_z \delta z_o. \tag{20}$$

$$\tan \bar{\theta}' = \sqrt{k_x/k_y} \tan \theta'. \tag{21}$$

and $$\tan \bar{\theta}_w = (\eta/\delta) \tan \theta_w. \tag{22}$$

The parameters $\alpha_x$, $\alpha_y$, $\alpha_z$, $\eta$, and $\delta$ in Eqs. 14-22 are defined as $$\alpha_x = \sqrt[6]{k_v/k_h} \sqrt[4]{k_y/k_x}. \tag{23}$$

$$\alpha_y = \sqrt[6]{k_v/k_h} \sqrt[4]{k_x/k_y}. \tag{24}$$

$$\alpha_z = \sqrt[3]{k_h/k_v}. \tag{25}$$

$$\eta = \sqrt{\sqrt{k_y/k_x}\cos^2\theta' + \sqrt{k_x/k_y}\sin^2\theta'}. \tag{26}$$

and $$\delta = \sqrt{\cos^2\theta_w + (k_v/k_h)\eta^2 \sin^2\theta_w}. \tag{27}$$

where k=permeability, md, superscript =effective property in an equivalent isotropic reservoir, $k_s$=spherical permeability, md, x=x coordinate in Cartesian coordinate system, ft, $\alpha_x$=constant defined by Eq. 23, dimensionless, y=y coordinate in Cartesian coordinate system, $\alpha_y$=constant defined by Eq. 24, dimensionless, z=z coordinate in Cartesian coordinate system, ft, $\alpha_z$=constant defined by Eq. 25, dimensionless, $k_x$=horizontal permeability in x-direction of a 3D anisotropic formation, md, $k_y$=horizontal permeability in y-direction of a 3D anisotropic formation, md, $l_w$=half-length of packer interval, ft, $\delta$=constant defined by Eq. 27, dimensionless, $z_o$=measured distance from the center of the producing probe/packer to the observation probe, ft, $\theta'$=azimuth angle of the well from the x-axis, degrees, $\theta_w$=inclination angle of the well from the vertical plane, degrees [0 (vertical well) to 90 (horizontal well)], and $\eta$=constant defined by Eq. 26, dimensionless.

In Eqs. 14-27, $k_h$, represents the geometric permeability on the horizontal plane, i.e., $k_h = \sqrt{k_x k_y}$, and $k_v$ ($=k_z$) represents the vertical permeability (in the z-direction) for a 3D anisotropic formation or reservoir. Also, the MDT terminology of FIGS. 1a-1c: $z_w = \Delta Z_{wf}$ and $z_o = \Delta Z_R$ is used.

Using Eq. 14 for transforming k, Eq. 17 for $z_w$, Eq. 18 for h, and Eq. 20 for $z_o$, a radial flow equation is obtainable for an observation probe, in a 3D anisotropic reservoir for all inclination angles of a well. The result is that Eqs. 1 and 2 remain unchanged; however, the intercept of the radial flow plot, b, becomes $$b = 162.6 \frac{q\mu}{k_h h}\left[\frac{\tilde{G}^* + \frac{h}{\delta|z_o|}}{2.303} + \log\left(\frac{0.0002637 k_v}{\phi \mu c_t h^2}\right)\right]. \tag{28}$$

$\tilde{G}^*$ is given by $$\tilde{G}^* = \frac{1}{\tilde{Z} + \tilde{Z}'} - 2\ln 2 - \gamma - \frac{1}{2}\sum_{i=1}^{4} \Psi\left(\frac{\tilde{a}_i + 1}{2}\right) \tag{29}$$

where $\tilde{Z} = (z_w + \delta z_o)/h$, $\tilde{Z}' = z_o/h$, and $$\tilde{a}_1 = 1 + \tilde{Z} + \tilde{Z}' : \tilde{a}_2 = 1 + \tilde{Z} - \tilde{Z}' : \tilde{a}_3 = 1 - \tilde{Z} + \tilde{Z}' : \tilde{a}_4 = 1 - \tilde{Z} - \tilde{Z}'. \tag{30}$$

where superscript =effective property in a 3D anisotropic reservoir, and $z_w$=vertical distance from the bottom of the formation to the center of the producing packer/probe, ft.

Note that for a 2D anisotropic reservoir, where permeability is assumed to be isotropic in the horizontal plane (i.e., $k_x = k_y$), $\eta = 1$ is obtainable from Eq. 26.

As noted above the method according to Prats is based on an assumption of a zero-radius (i.e., line-source) wellbore. For Eqs. 1-5 to apply to a finite-radius wellbore in an isotropic reservoir (i.e., $k_h = k_v$), Eq. 13 becomes $$|z_o| < 25 r_w. \tag{31}$$

Therefore, for Eqs. 1, 2, and 28-30 to apply to a finite-radius inclined wellbore in a reservoir having 3-dimensional permeability anisotropy, Eq. 31 must be transformed. Eq. 20 may be used to replace $z_o$; $r_w$ which may be replaced by the expression provided in Besson:

$$\bar{r}_w = \frac{r_w}{2\eta\sqrt{\alpha_z}}\sqrt{(1+\eta^2/\delta)^2 + \left[\left(\sqrt{k_x/k_y} - \sqrt{k_y/k_x}\right)\frac{\cos\theta_w \cos\theta' \sin\theta'}{\delta}\right]^2}. \tag{32}$$

With $z_o$ replaced by $\bar{z}_o$ and $r_w$ replaced by $\bar{r}_w$ in Eq. 31, the resulting transformation for a 3D anisotropic reservoir is $$|z_o| > \frac{25 r_w}{2\delta \eta a_z^{3/2}} \sqrt{(1+\eta^2/\delta)^2 + \left[\left(\sqrt{k_x/k_y} - \sqrt{k_y/k_x}\right)\frac{\cos\theta_w \cos\theta' \sin\theta'}{\delta}\right]^2} \quad (33)$$

For a 2D anisotropic reservoir, $k_x=k_y$ and $\eta=1$; thus Eq. 33 becomes $$|z_o| > \frac{25 r_w}{2\delta a_z^{3/2}}(1+1/\delta). \quad (34)$$

Radial-flow equations for a 3D anisotropic reservoir given by Eqs. 1, 2, and 28-30 for three different cases depending on the inclination angle: vertical well ($\theta_w=0$), horizontal well ($\theta_w=90$), and inclined well ($0<\theta_w<90$) are as follows.

In the case of a vertical well, such as the wellbore 12 shown in FIGS. 1a and 1b, $\theta_w=0$; thus, $\delta=1$ is obtainable from Eq. 27. Thus, Eqs. 28-30 are identical to Eqs. 3-5 for the 2D anisotropic case. This indicates that Eqs. 3-5, usable for a 2D anisotropic case, are also usable for the more general case of a 3D anisotropic reservoir for an observation probe located along a vertical wellbore, such as, for example first probe 20 located within wellbore 14.

In the case of a horizontal well, $\theta_w=90$; thus, $\delta=\eta\sqrt{k_v/k_h}$ may be obtained from Eq. 27. Thus the intercept b given by Eq. 28 is a nonlinear function of $k_v$, $k_h$, and $\eta$ for the case of 3D anisotropy. For a 2D anisotropic reservoir, $\eta=1$; thus $\delta=\sqrt{k_v/k_h}$ and the intercept b given by Eq. 28 is a nonlinear function of $k_v$ and $k_h$.

In the case of an inclined well where ($0<\theta_w<90$), the intercept b given by Eq. 28 is a nonlinear function of $k_v$, $k_h$, $\theta_w$, and $\eta$ for the case of 3D anisotropy. For a 2D anisotropic reservoir, $\eta=1$; thus the intercept b given by Eq. 28 is a nonlinear function of $k_v$, $k_h$, and $\theta_w$.

To evaluate the present system and method with respect to inclined wellbores, a case of a 2D anisotropic reservoir was considered and the validity of Eqs. 1, 2, and 28-30 was checked by utilizing the MdtPackerProbe program. An intercept of the radial-flow plot, b, given by Eqs. 28-30 was compared with that from radial-flow analysis of data from the MdtPackerProbe program. For a 2D anisotropic reservoir, $\eta=1$; therefore Eq. 28 may be written as $$b = 162.6 \frac{q\mu}{k_h h}\left[\tilde{G}^* + \frac{h}{\frac{\sqrt{\cos^2\theta_w + (k_v/k_h)\sin^2\theta_w}|z_o|}{2.303}} + \log\left(\frac{0.0002637 k_v}{\phi \mu c_t h^2}\right)\right]. \quad (35)$$

$\tilde{G}^*$ is given by Eq. 29 with $Z=(z_w+\sqrt{\cos^2\theta_w+(k_v/k_h)\sin^2\theta_w}z_o)/h$, and $\overline{Z}'=z_w/h$.

The restriction on $z_o$ given by Eq. 34 for a 2D anisotropic reservoir may be written as $$|z_o| > \frac{12.5 r_w \sqrt{k_v/k_h}}{\sqrt{\cos^2\theta_w + (k_v/k_h)\sin^2\theta_w}}\left(1 + \frac{1}{\sqrt{\cos^2\theta_w+(k_v/k_h)\sin^2\theta_w}}\right) \quad (36)$$

Figures 12, 13, 14:
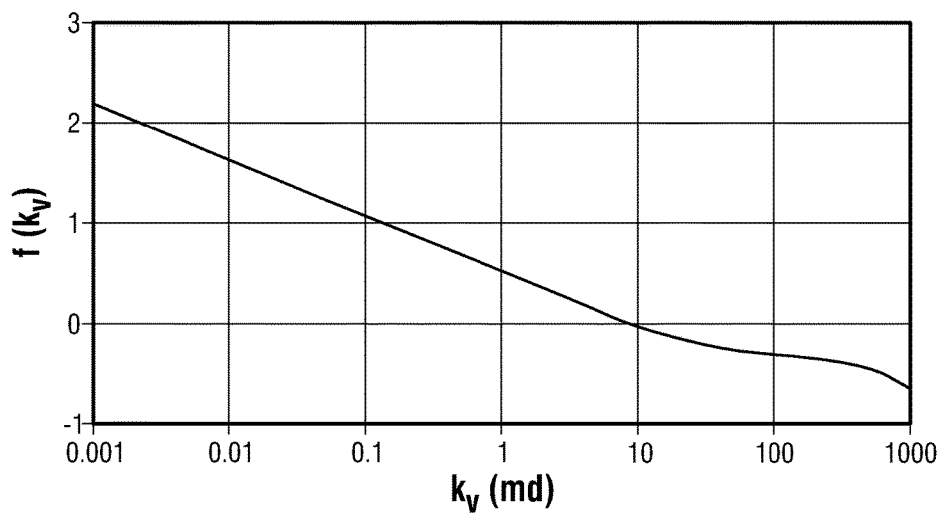
FIG. 12 is a table showHing comparison values of an intercept of a radial flow plot for an inclined well with 2-dimensional permeability anisotropy in accordance with an embodiment.
FIG. 13 is a table showing computed values for vertical permeability for an inclined well with 2-dimensional permeability anisotropy in accordance with an embodiment.
FIG. 14 illustrates a graph showing a plot of a function of vertical permeability versus vertical permeability for an inclined well with 2-dimensional permeability anisotropy in accordance with an embodiment.

Eqs. 35 and 36 apply for values of well inclination, $0<=\theta_w<=90$. A table illustrated in FIG. 12 compares the values of b computed from Eq. 35 and from MdtPackerProbe as a function of the inclination angle of the well for a case with constant-rate flow at 14 bbl/d. The test duration was long enough so that observation-probe pressure exhibited a well-defined radial-flow regime. The table in FIG. 12 also presents the values of the $z_o$ requirement computed from the right-hand side of Eq. 36. Other input parameter values were taken from Synthetic Case 4 presented previously: h=20 ft, $k_h$=100 md, $k_v$=10 md, $z_w$=8 ft, $z_o$=6.2 ft, $\mu$=0.5 cp, $\phi$=0.2, $c_t$=8e-6 1/psi, $p_{i,o}$=5000 psi, $l_w$=1.6 ft, and $r_w$=0.25 ft.

The error in the value of b from Eq. 35 for all inclination angles is less than 2% when compared to the simulation value generated by the MdtPackerProbe program. Thus, Eq. 35 provides an accurate or substantially accurate approximation for a radial-flow plot intercept. For this case, $z_o$=6.2 ft, so inclination angles less than 80° of Table 1 meet the requirement given by Eq. 36; however, the error in b is largely unaffected.

Eqs. 1-5 are valid for a vertical well in a 2D anisotropic reservoir. Further, for inclined wells and 3D anisotropy, Eqs. 1, 2, and 28-30 may be used. Also, for a vertical well in a 3D anisotropic reservoir, $\delta=1$ and thus Eqs. 28-30 are identical to Eqs. 3-5; therefore, the systems and methods apply for vertical wells, regardless of the degree of anisotropy associated with the vertical well or reservoir.

For inclined wells, application of Eqs. 1-5 will result in error which may not be acceptable to one of ordinary skill in the art. To demonstrate the error associated with application of Eqs. 1-5 for an inclined well, the data used for the table in FIG. 12 were analyzed with the assumption that the well is vertical. The results show that for all cases $k_h$ is correctly determined to be about 100 md. The computed $k_v$ values are listed in a table shown in FIG. 13, and the correct value of $k_v$ is 10 md.

Note that an error of 8.4% at 0 degree inclination is the inherent error in the method as shown earlier for Synthetic Case 4. In summary, the results set forth in the table shown in FIG. 13 indicate that the vertical-well method may be applied for wellbore inclinations up to about 15 degrees without introducing significant error; however, for larger inclinations (i.e., greater than about 15 degrees), the error in $k_v$ may become unacceptable to one of ordinary skill in the art.

For inclined wells, the intercept b given by Eq. 28 is a nonlinear function of $k_v$, $k_h$, $\theta_w$, and $\eta$ for the case of 3D anisotropy. For a 2D anisotropic reservoir, $\eta=1$; thus the intercept b is a nonlinear function of $k_y$, $k_h$, and $\theta_w$, as given by Eq. 35. For a test conducted in an inclined well, radial-flow analysis will provide values for $k_h$ and b. Therefore, to obtain a value for $k_v$, a nonlinear solution technique must be used. In addition, values for $\theta_w$ and $\eta$ (if in the case of 3D anisotropy) must be known a priori. Inclination and azimuth angles of the well ($\theta_w$, and $\theta'$, respectively) may be known from a drilling survey. For the case of 3D anisotropy, an estimate for $k_x/k_y$ may be obtained from core data or geologic modeling; values for $k_x/k_y$ and $\theta'$ are required to estimate $\eta$.

To further illustrate the analysis procedure for determining $k_v$ for an inclined well, a case of 2-dimensional permeability anisotropy is considered. It is required to find a value of $k_v$ that satisfies Eq. 35 for the values of for $k_h$ and b from a radial-flow analysis, and given values of well and reservoir parameters such as $\theta_w$, h, $\mu$, $z_o$, $z_w$, q, $\phi$, $r_w$, and $c_t$. The requirement is expressed as $$f(k_v) = b - 162.6 \frac{q\mu}{k_h h} \left[ \tilde{G}^{*'} + \frac{\sqrt{\cos^2\theta_w + (k_v/k_h)\sin^2\theta_w} |z_o|}{2.303} + \log\left(\frac{0.0002637 k_v}{\phi\mu c_t h^2}\right) \right] = 0. \quad (37)$$

where f=nonlinear function defined by Eq. 37.

Note that $\tilde{G}^{*'}$ is also a function of $k_v$. Eq. 37 is a nonlinear function of $k_v$. The Newton-Raphson method, as provided in, for example, Press, W. H., Flannery, B. P., Teukolsky, A. A., and Vetterling, W. T.: Numerical Recipes: The Art of Scientific Computing, Cambridge University Press, 2007. ISBN 0-521-88068-8, may be suitable for solving this nonlinear equation for $k_v$. This method requires the derivative of the function, which will require the derivative of $\tilde{G}^*$; this will require the derivative of the digamma function, $\Psi$. An algorithm for this derivative is provided in, for example, Amos, D. E.: "A Portable FORTRAN Subroutine for Derivatives of the Psi Function," Algorithm 610, ACM Transactions on Mathematical Software (December 1983) 494-502.

An alternative to a nonlinear solution technique is a graphical method which involves plotting $f(k_v)$ vs. $k_v$, and visually finding a zero point. As an example of the graphical method, the data used to generate the table shown in FIG. 12 have been used with Eq. 37 to compute $f(k_v)$ vs. $k_v$, for the case of $\theta_w = 45°$, and the result is displayed in FIG. 14. It can be visually seen from the graph in FIG. 14 that $f(k_v)=0$ at $k_v=10$ md, which is the correct solution.

The present disclosure provides a method to determine a property indicative of permeability of the reservoir 14, such as, for example, the formation horizontal mobility and/or vertical mobility, the formation horizontal permeability and/or vertical permeability from the radial-flow response at or adjacent to the setting position 22 of the first probe 20. The method may be utilized for more general cases of an inclined wellbore in a reservoir having 3-dimensional permeability anisotropy. The wellbore inclination may range from 0 (vertical well) to 90 degrees (horizontal well). Advantageously, the method may be utilized with wellbores flowing at any constant flow rate, any non-constant flow rate and/or where a drawdown testis followed with a buildup test.

The analysis results presented herein were generally in substantial agreement with the input values. In cases where the needed requirements were violated, error was seen in the $k_v$ result; but the $k_h$ value was determined without error unacceptable to one of ordinary skill in the art. For an IPTT test conducted where $k_v$ exceeds $k_h$ by a factor of two or more, the standard spacing of the observation probe (i.e., the first probe 20) may be too small. For an IPTT test where the formation testing tool is a dual-packer, it may be likely that the restriction on the length of the flowing interval of the dual-packer tool will be exceeded by a large margin; however, the synthetic cases illustrate that the error in $k_v$ may remain less than 10%, which may be acceptable to one of ordinary skill in the art.

Although several embodiments of the present system and method have been described in detail herein with reference to the accompanying drawings, it is to be understood that the disclosure is not limited to these precise embodiments, and that various changes and modifications may be effected therein by one skilled in the art without departing from the scope of spirit of the disclosure as defined in the appended claims. For example, although the embodiments described herein have been primarily directed to hydrocarbon reservoirs, the disclosure is not so limited. Those of skill in the art will appreciate that the present system and method are also readily applicable to other types of underground reservoirs. An example of another type of fluid bearing reservoir that the system and method are readily applicable to is subterranean water reservoirs and water layers.

What is claimed is:

1. A method comprising:
    positioning a formation testing tool within a wellbore formed within a subsurface reservoir, wherein the tool has an observation probe configured to obtain pressure data;
    analyzing via the formation testing tool the obtained pressure data to determine when radial flow is reached;
    determining via the formation testing tool vertical permeability or vertical mobility of the reservoir based on when radial flow is reached and a Horner analysis of the subsurface reservoir at or adjacent to the observation probe.

2. The method according to claim 1, wherein the reservoir has three-dimensional permeability anisotropy.

3. The method according to claim 1, further comprising:
    determining via the formation testing tool horizontal permeability or horizontal mobility of the reservoir based on when radial flow is reached and a Horner analysis of the subsurface reservoir at or adjacent to the observation probe.

4. The method according to claim 1, wherein the vertical permeability or the vertical mobility of the reservoir is determined based on a graphical interpretation of pressure data collected by the observation probe.

5. The method according to claim 1, wherein the determining the vertical permeability or the vertical mobility is accomplished without an initial estimate of model parameters.

6. The method according to claim 1, wherein the tool has a second probe or two packer elements configured to withdraw or inject fluid into the subsurface reservoir.

7. The method according to claim 1, wherein the tool is configured to conduct an interval pressure transient test (IPTT) of the subsurface reservoir.

8. A method comprising:
    obtaining pressure measurements with an observation probe of a formation testing tool during a pressure drawdown test or pressure buildup test, wherein the observation probe is located at a setting position within a wellbore formed within a subsurface geological reservoir and the wellbore is an open hole wellbore;
    determining via the formation testing tool when radial flow of the reservoir at or adjacent to the setting position of the observation probe is reached by analyzing the collected pressure data;
    determining via the formation testing tool horizontal permeability or horizontal mobility of the reservoir based on when radial flow is reached and a Horner analysis of the reservoir at or adjacent to the observation probe; and
    determining via the formation testing tool vertical permeability or vertical mobility of the reservoir based on when radial flow is reached and a Horner analysis of the reservoir at or adjacent to the observation probe.

9. The method according to claim 8, wherein the setting position is at a portion of the wellbore that is inclined at an angle greater than 5 degrees and less than 85 degrees.

10. The method according to claim 8, wherein the horizontal permeability, the horizontal mobility, the vertical mobility and the vertical permeability are determined without use of an iterative method.

11. The method according to claim 8, wherein the horizontal permeability, the horizontal mobility, the vertical mobility and the vertical permeability are determined based on a graphical method.

12. The method according to claim 11, wherein the graphical method results in a linear function with respect to the horizontal permeability, the horizontal mobility, the vertical mobility or the vertical permeability.

13. The method according to claim 8, further comprising:
   determining formation permeability of the reservoir via a direct analytical solution based on the collected pressure data.

\* \* \* \* \*